US012399265B1

(12) United States Patent
Chillara et al.

(10) Patent No.: US 12,399,265 B1
(45) Date of Patent: Aug. 26, 2025

(54) ADAPTING PULSED ULTRASONIC SIGNALS FOR PROXIMITY SENSING

(71) Applicant: Amazon Technologies, Inc., Seattle, WA (US)

(72) Inventors: Vamshi Krishna Chillara, Quincy, MA (US); Harsha Inna Kedage Rao, Campbell, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/373,092

(22) Filed: Sep. 26, 2023

(51) Int. Cl.
  *G01S 7/524* (2006.01)
  *G01S 15/10* (2006.01)
(52) U.S. Cl.
  CPC ............ *G01S 7/524* (2013.01); *G01S 15/102* (2013.01)
(58) Field of Classification Search
  None
  See application file for complete search history.

(56) References Cited

U.S. PATENT DOCUMENTS

| 10,034,655 | B2* | 7/2018 | McKinnis | A61B 8/488 |
| 11,219,373 | B2* | 1/2022 | Eggers | A61B 5/681 |
| 11,707,198 | B2* | 7/2023 | Eggers | A61B 8/488 600/301 |
| 2020/0093462 | A1* | 3/2020 | Fatemi | A61B 8/0841 |
| 2020/0121199 | A1* | 4/2020 | Freeman | A61B 5/4875 |
| 2021/0353365 | A1* | 11/2021 | Olafsen | A61B 34/20 |
| 2023/0049776 | A1* | 2/2023 | Freeman | A61B 5/024 |

* cited by examiner

Primary Examiner — Fekadeselassie Girma
(74) Attorney, Agent, or Firm — Eversheds Sutherland (US) LLP

(57) ABSTRACT

Techniques for proximity-sensing devices to adapt signal parameters of pulsed ultrasonic signals that are used for proximity sensing based on distances between the devices and users. The devices may increase the pulse widths and/or pulse strengths when estimating user distances at longer distance ranges and decrease the pulse widths and/or strengths when estimating user devices at shorter distance ranges. Further, the proximity-sensing devices can increase the amount of time between pulse emissions when the user is walking around a room as compared to when the room is empty. The proximity-sensing devices can also adaptively change the signal parameters to compensate for audio playback effects caused by concurrent emission of audible sound, and to track different types of user motion (e.g., major motion, minor motion, static, etc.).

20 Claims, 16 Drawing Sheets

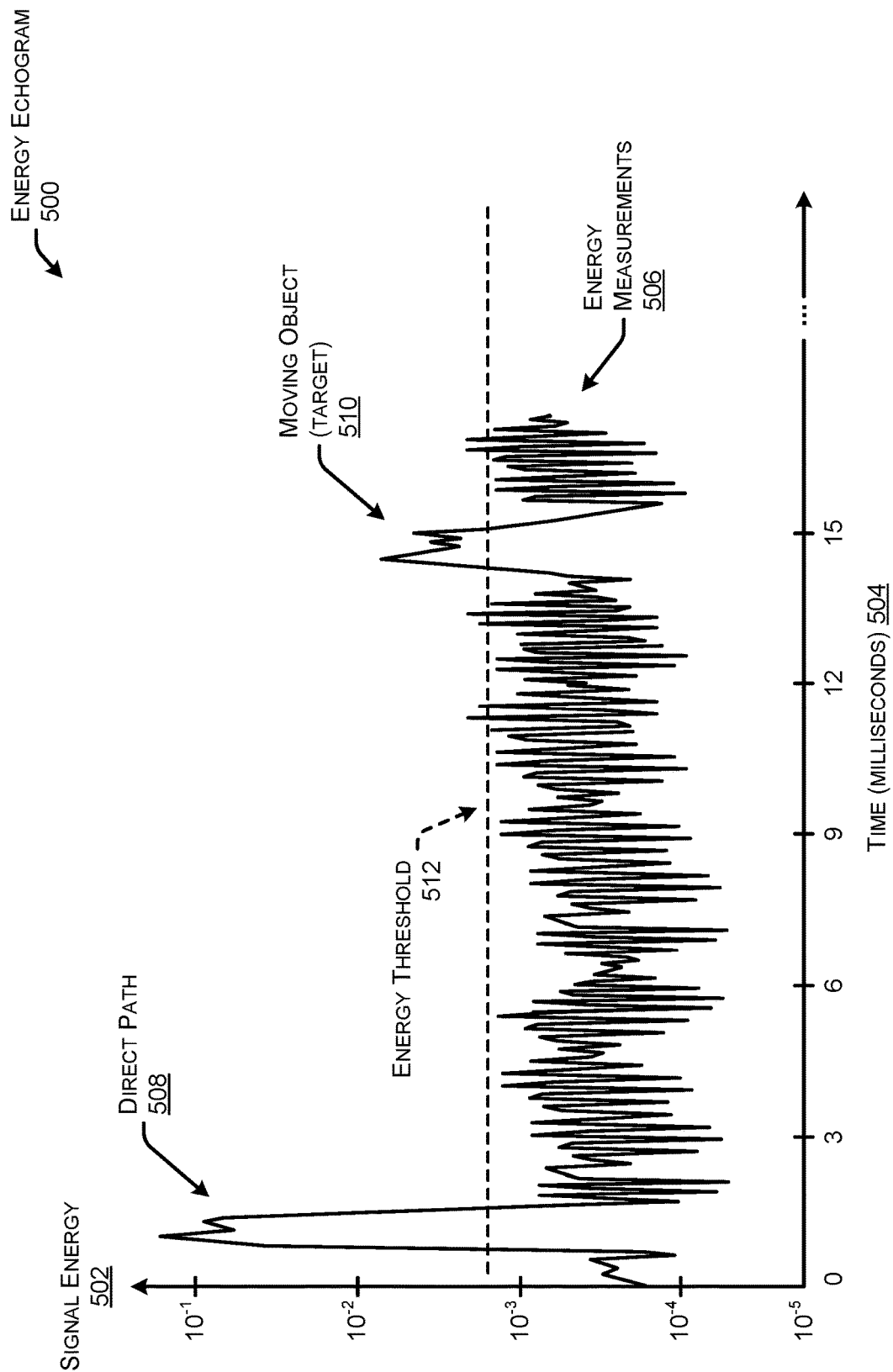

ADAPTING PULSED ULTRASONIC SIGNALS FOR PROXIMITY SENSING

BACKGROUND

Many devices and technologies exist for detecting the proximity of users in different environments, and for different purposes. For instance, motion-sensing lights are used to automate lighting control based on detecting motion, motion-sensing security devices can trigger alarms upon detecting motion, etc. These proximity-sensing devices can utilize many different technologies to detect the proximity or location of a user in an environment, such as acoustic sensing, passive infrared sensing (PIR) sensing, Wi-Fi Channel Sate Information (CSI) sensing, radio-wave sensing, etc. To perform many of these types of proximity-sensing techniques, the proximity-sensing devices are often equipped with specialized hardware, such as specialized sensors, specialized processors, etc. However, the different types of specialized hardware required by proximity-sensing devices to detect proximity or location can be disadvantageous for many reasons, such as the high cost to include in devices, consumption of large amounts of power, emitting large amounts of heat, etc. Additionally, beyond being able to detect proximity or location, existing presence-sensing devices are unable to provide further contextual information about the user in the environment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5A illustrates an example energy echogram that illustrates energy measurements of reflection signals correspond to reflections of pulsed ultrasonic signals that reflected off a moving object in an environment.

DETAILED DESCRIPTION

Figure 1:
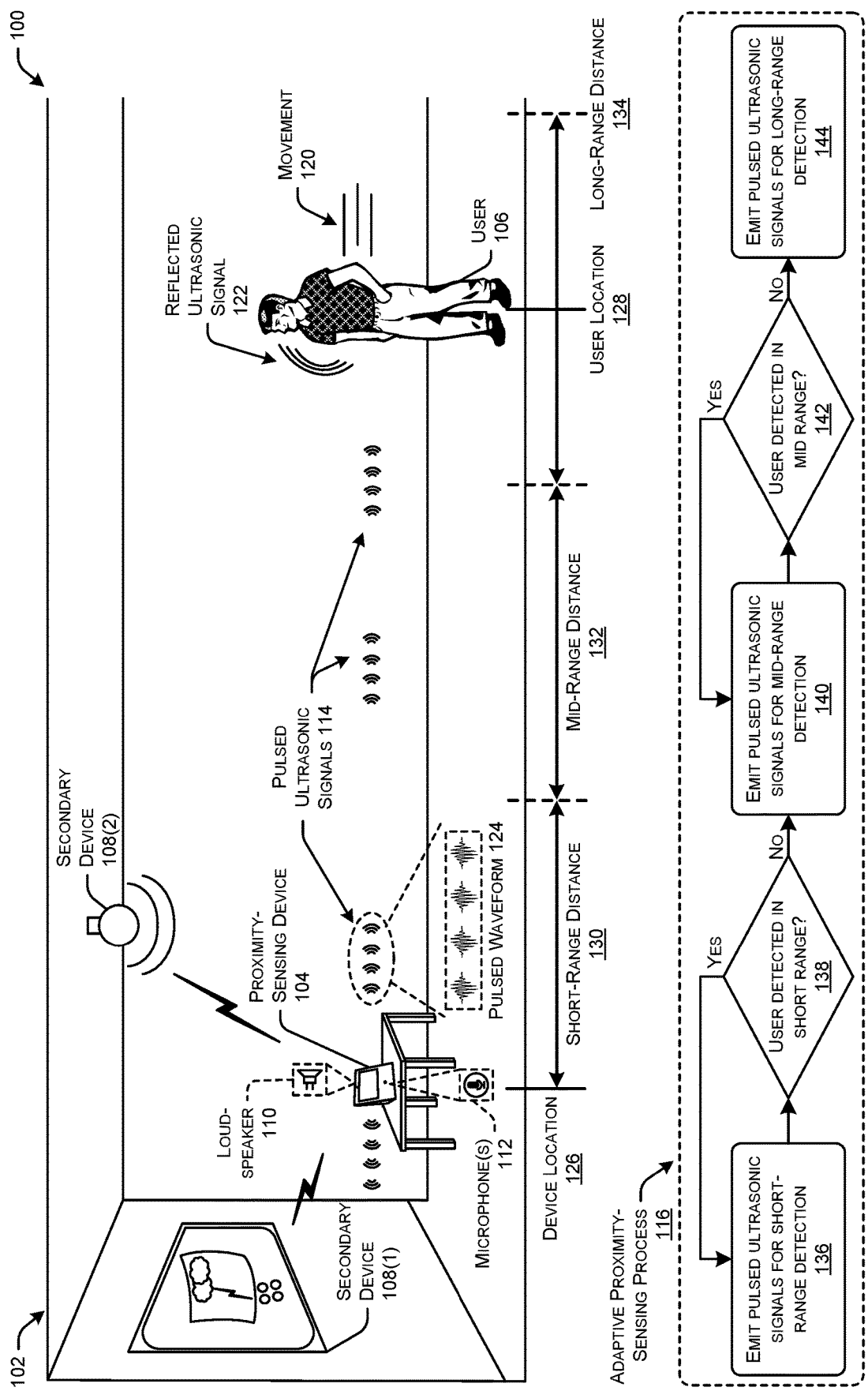
FIG. 1 shows an illustrative interactive architecture set in a home environment. The architecture includes a proximity-sensing device that adapts the signal parameters of pulsed ultrasonic signals based on a proximity of a user relative to the device.

This disclosure describes, in part, a proximity-sensing device that adapts signal parameters of pulsed ultrasonic signals that are used for proximity sensing based on distances between the device and a user. The device uses a speaker to emit short bursts (or "pulses") of ultrasonic signals for short periods of time, and a microphone to receive reflections of those signals off objects in the room. The device then tracks changes in energy measurements across the reflections to determine distances between the device and the user. Emitting the pulsed ultrasonic signals at higher emission powers may increase the accuracy of the proximity-sensing techniques, but also reduces battery life and can result in overheating. The device described herein adaptively changes the signal parameters of the pulsed ultrasonic signals based on different distances or ranges between the user and the device. For instance, the device can increase the pulse widths and/or pulse strengths when estimating user distance at the higher distance ranges as compared to the shorter distance ranges. Further, the proximity-sensing device may increase the amount of time between pulse emissions when the user is walking around a room (major motion) as compared to when the room is empty. The proximity-sensing device may also adaptively change the signal parameters to compensate for audio playback effects caused by concurrent emission of audible sound, and to track different types of user motion (e.g., major motion, minor motion, static, etc.)

In some examples, the proximity-sensing device may be installed or placed in an environment to monitor a location, such as a room of a house. For instance, the proximity-sensing device may be a display device that presents content to users, a light switch that is installed in a room, a voice-interface device moved into a room to interact with a user through voice, a security-system device to monitor a location, etc. The proximity-sensing device may periodically, or continuously, emit pulsed ultrasonic signals (e.g., frequencies above 20 kHz) into the room to determine if one or more users are moving in the room, or depending on the use-case, whether the room is vacant. The proximity-sensing device may use the loudspeaker to emit pulsed ultrasonic signals at a determined duty cycle, and generate data representing reflection signals using the microphone. For example, the loudspeaker may emit pulsed ultrasonic signals, or short "bursts" of ultrasonic sound (e.g., 1 millisecond (ms), 5 ms, etc.), for an "on" portion of the duty cycle, and may then stop emitting ultrasonic sound, or greatly reduce the power at which ultrasonic sound is being emitted, for an "off" portion of the duty cycle (e.g., 25 ms, 50 ms, etc.). The proximity-sensing device may use a microphone to generate data representing reflections of the pulsed ultrasonic signals.

Generally, the data may represent energy of reflections of individual pulsed ultrasonic signals in respective "frames," or periods of time in which reflections from one of the pulsed ultrasonic signals are primarily or entirely represented in the data. The frames may be represented in the data in that an individual frame begins before, during, or right after a pulsed ultrasonic signal is emitted, continues during the "off" cycle when reflection signals are reflecting off objects and back towards the device, and end when a next pulsed ultrasonic signal is going to be emitted. In this way, a frame of the generated data represents reflection signals corresponding to one pulsed ultrasonic signal, and represent energy measurements for the reflection signals when received back at the device.

The proximity-sensing device may analyze the data on a frame-by-frame basis and determine amounts of energy for each frame representing energy measurements for each reflection signal. The energy measurements may represent the energy of a reflection signal, or a strength of the reflection signal, when that signal is received by the microphone of the proximity-sensing device. The data may represent the reflection signals as continuous-time signals that have a varying amplitude over time. Generally, the energy of a signal corresponds or is correlated to the total magnitude of the signal, and the proximity-sensing device may determine energy values for the reflected signals using various algorithms and the generated data as described below (in some instances, audio data). In addition to determining the energy values, the proximity-sensing device may identify and track the times at which the reflected signals were received back at the device and map those times to the respective energy values for that reflected signal. Thus, the proximity-sensing device determines the time-of-flight (ToF) values for reflected signals, and map those ToF values to the energy values for the reflected signals. The ToF is generally representative of distance with respect to sound signals or waves because the sound waves move at the speed of sound (e.g., 343 m/s), and ToF and speed of sound can be used to easily calculate distance.

The proximity-sensing device may then compare the energy measurements and ToF values for reflected signals across multiple frames, such as frames that represent two pulsed ultrasonic signals that were emitted in series with each other. Stated otherwise, the reflected signals that have the same, or similar, ToF and/or energy measurements in sequential frames are likely bouncing off the same objects because the difference in time across frames is on the order of milliseconds. Based on that comparison, the proximity-sensing device may determine which of the reflected signals had the largest change in energy across the frames. A change in energy indicates a change in the distance between the device and object off which the reflected signal is reflecting. Thus, the largest change in energy values across frames will correspond to the largest moving object in the environment, such as a user. In this way, the proximity-sensing device may determine that a user is moving in the environment.

Generally, the proximity-sensing device may emit pulsed ultrasonic signals with lower transmission power to detect users that are near the device, or in short proximity (e.g., withing 4 feet), and higher transmission power to detect users at longer distances from the device (e.g., greater than 4 feet, greater than 8 feet, etc.). To increase or decrease the transmission power of ultrasonic signals, the proximity-sensing device may increase a pulse strength of the ultrasonic signals (e.g., amplitude), and/or increase a pulse width of the ultrasonic signals. An increase in the pulse strength or pulse width of the ultrasonic signals generally corresponds to an increase in the signal strength of the reflections of the signals off objects in the environment. In order to reduce the amount of power consumed by the proximity-sensing devices when performing the proximity-sensing techniques described herein, the proximity-sensing device may adaptively change the signal parameters of the pulsed ultrasonic signals.

The proximity-sensing device may initially emit short-range pulsed ultrasonic signals that have signal parameters that are usable to detect proximities of users within a short-range distance (e.g., less than 3 feet, less than 4 feet, etc.). The short-range pulsed ultrasonic signals (or "short-range signals") may be emitted with a predefined pulse width (e.g., 4 ms, 5 ms, etc.), and a predefined pulse strength (e.g., 30 decibels (dB) sound pressure level (SPL), 40 dB SPL, etc.). Further, the short-range signals may be pulsed, or emitted, according to a predefined pulse spacing, or "frame rate" (e.g., 32 ms, 40 ms, etc.). The proximity-sensing device may start the proximity-sensing process in a short-range detection process where the pulsed ultrasonic signals are emitted with the short-range signal parameters to determine whether a user is moving within the short-range distance. If the proximity-sensing device detects movement of a user within the short-range distance, the proximity-sensing device may determine to increase the pulse spacing (i.e., reduce frame rate) in order to limit the power usage while the proximity-sensing device tracks the user while the user is within the short-range distance.

However, if the proximity-sensing device does not detect a user moving within the short-range distance, the proximity-sensing device may transition into a mid-range process. In the mid-range process, the proximity-sensing device may increase the pulse width of the pulsed ultrasonic signals (e.g., 6 ms, 8 ms, etc.) to result in mid-range signals in order to increase the signal-to-noise (SNR) ratio for the reflection of the signals off objects within the mid-range distance (e.g., 4-8 feet). The proximity-sensing devices may emit the mid-range signals in a mid-range detection process to determine whether a user is moving within the mid-range distance. If the proximity-sensing device detects movement of a user within the mid-range distance, the proximity-sensing device may determine to increase the pulse spacing (i.e., reduce frame rate) in order to limit the power usage while the proximity-sensing device tracks the user while the user is within the mid-range distance.

However, if the proximity-sensing device does not detect a user moving within the mid-range distance, the proximity-sensing device may transition into a long-range process. In the long-range process, the proximity-sensing device may increase the pulse strength of the pulsed ultrasonic signals (e.g., 55 dB, 60 dB, etc.) to result in long-range signals in order to increase the SNR ratio for the reflection of the signals off objects within the long-range distance (e.g., 8 feet or further). In some instances, the proximity-sensing device may additionally reduce the pulse width of the long-range signals to help preserve power. In some examples, the pulse strength of the long-range signals may be increased by a factor (e.g., 50% increase, 75% increase, etc.) from the mid-range signals, and the pulse width may be reduced by the same factor as compared to the mid-range signals (and may be the same as the pulse width for the short-range signals, in some instances). The proximity-sensing devices may emit the long-range signals in a long-range detection process to determine whether a user is moving within the long-range distance. If the proximity-sensing device detects movement of a user within the long-range distance, the proximity-sensing device may determine to increase the pulse spacing (i.e., reduce frame rate) in order to limit the power usage while the proximity-sensing device tracks the user while the user is within the long-range distance.

In examples where the proximity-sensing device is unable to detect a user moving within the long-range distance, the proximity-sensing device may increase the pulse width for a predefined period of time in order to determine if a user moves into the long-range distance. After the period of time, the proximity-sensing device may then move from the long-range detection process back into the short-range detection process.

In some instances, the proximity-sensing device may output audible sound to users, such as music, news briefings, and/or responses as part of a dialogue with the user. The proximity-sensing device may wish to output the pulsed ultrasonic signals concurrently with the audible sound in order to do proximity sensing. However, concurrent output of the audible sound with the pulsed ultrasonic signals can have various negative effects on the performance of the proximity-sensing processes, such as by increasing the amount of noise in the generated audio data and smearing of the pulsed ultrasonic signals. To account for this, the proximity-sensing device may receive and store concurrent-playback parameters that are used to emit ultrasonic signals concurrently with audible sound. For instance, the concurrent-playback parameters may include higher pulse strengths at which to emit the pulsed ultrasonic signals to improve the SNR ratios. In some examples, the concurrent-playback parameters may include shorter pulse widths to help avoid smearing. However, various concurrent-playback parameters may be used to help account for the effects of concurrent audio playback with the pulsed ultrasonic signals.

In some examples, the proximity-sensing device may emit the pulsed ultrasonic signals using motion-dependent signal parameters that are used based on the type of motion being detected. For instance, the proximity-sensing device may determine if there is major motion (e.g., the user walking towards or away from the device), minor motion (e.g., user washing dishes, cooking food, etc.), or the user is static (e.g., distance is almost constant, such as the user sitting down). The proximity-sensing device may use the motion-dependent parameters based on the different types of motion being detected. As an example, the proximity-sensing device may emit ultrasonic signals with a higher pulse spacing when major motion has been detected as the user is relatively easy to sense during major motion and less pulses are needed. As another example, the proximity-sensing device may use smaller pulse spacing (higher frame rate) with lower pulse width during minor motion as the movements are more difficult to detect are more frames are necessary. As an even further example, the proximity-sensing device may use higher pulse spacing (low frame rate) when the user is static in order to detect any movements that might be made by the user.

In some instances, the proximity-sensing device may continue to track the movement of the user(s) in the environment. For instance, the proximity-sensing device may continue to emit pulsed ultrasonic signals, generate new frames of data, and determine new ToF values and energy measurement changes for the large, or dominant, objects in the environment (e.g., users). The proximity-sensing device can determine whether the ToF values are increasing, indicating that a user is moving away from the device, or decreasing which indicates that the user is moving towards the device.

The proximity-sensing device may perform various operations based on the determinations made herein, such as a proximity/distance of the user relative to the device, and whether the user is moving towards or away from the device. For instance, the proximity-sensing device may cause various secondary devices to turn on or off (e.g., lights, television, security alarm, etc.), optimize the output of music data to create auditory "sweet spots" for the person as they move through the room, perform more effective beamforming techniques based on the location and/or movement of the user, and so forth. In one illustrative example, the proximity-sensing device may determine whether a user is within the short-range distance (e.g., 3 feet, 4 feet, etc.) to a proximity-sensing device that has a display. If the user is within the threshold distance, the proximity-sensing device may cause content to be presented on the display, or change a size of the content being displayed. For example, if a user moves within the short-range distance of the proximity-sensing device, the device may change the font size of text or size of images, change the brightness of content on the display, change what is presented on the display, start outputting content on the display (e.g., show the time or weather), and/or perform other operations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 shows an illustrative interactive architecture 100 set in a home 102. The architecture includes a proximity-sensing device 104 that adapts the signal parameters of pulsed ultrasonic signals 114 based on a proximity of a user 106 relative to the proximity-sensing device 104.

The architecture 100 includes at least one proximity-sensing device 104 controlling secondary devices 108 (e.g., television 108(1), light 108(2), or any other controllable device) physically situated in the home 102 based on detecting presence of the user 106. In this example, the proximity-sensing device 104 includes or comprises a display device that has a loudspeaker 110 and one or more microphones 112 to detect proximity, and/or direction of movement, of the user 106.

As shown in FIG. 1, the loudspeaker 110 of the proximity-sensing device 104 may transmit, or otherwise output, pulsed ultrasonic signals 114. Generally, the loudspeaker 110 may comprise any type of electroacoustic transducer that convers an electric audio signal into a corresponding sound. Generally, the loudspeaker 110 may be an existing on-board speaker configured to output sound within frequency ranges that are audible to humans, such as 35 Hz-20 kHz. However, in the illustrated example the emitted sound may include at a pulsed emission of sound (or "pulsed ultrasonic signals 114") at a frequency that is outside the frequency range in which humans can hear sound (e.g., over 20 kHz). Thus, the loudspeaker 110 may be emitting sound, such as ultrasonic signals, that may be traditionally out-of-band for the loudspeaker 110. As illustrated, FIG. 1 may represent an adaptive proximity-sensing process 116 performed by the proximity-sensing device 104 in order to detect movement of an object at different distances or ranges, such as the user 106.

The proximity-sensing device 104 may cause the loudspeaker 110 to emit the ultrasonic sound (e.g., pulsed ultrasonic signals 114) into the home 102. In some examples, the proximity-sensing device 104 may emit pulsed ultrasonic signals 114 according to a duty cycle. For example, the loudspeaker 110 may emit pulsed ultrasonic signals 114, or short "bursts" of ultrasonic sound (e.g., 1 ms, 5 ms, etc.), for an "on" portion of the duty cycle, and may then stop emitting pulsed ultrasonic signals 114, or greatly reduce the power at which pulsed ultrasonic signals 114 is being emitted, for an "off" portion of the duty cycle (e.g., 25 ms, 50 ms, etc.).

The proximity-sensing device 104 may be located at a device location 126 and the user may be located at a user location 128. As shown, there are different distances or ranges from the proximity-sensing device 104, such as a short-range distance 130 (e.g., less than 3 feet, less than 4 feet, etc.), a mid-range distance 132 (e.g., 4-8 feet), and a long-range distance 134 (e.g., 8 feet or further). However, these distances may be any distance from the proximity-sensing device 104 and the distances are configurable and may vary based on the device, environment, etc.

In the adaptive proximity-sensing process 116, the proximity-sensing device 104 may, at 136, initially emit short-range pulsed ultrasonic signals 114 that have signal parameters that are usable to detect proximities of users within a short-range distance 130. The short-range pulsed ultrasonic signals 114 (or "short-range signals") may be emitted with a predefined pulse width (e.g., 4 ms, 5 ms, etc.), and a predefined pulse strength (e.g., 30 decibels (dB) sound pressure level (SPL), 40 dB SPL, etc.). Further, the short-range signals may be pulsed, or emitted, according to a predefined pulse spacing, or "frame rate" (e.g., 32 ms, 40 ms, etc.). The proximity-sensing device 104 may start the proximity-sensing process in a short-range detection process where the pulsed ultrasonic signals are emitted with the short-range signal parameters to determine whether a user is moving within the short-range distance.

At 138, the proximity-sensing device 104 may determine if the user 106 was detected in the short-range distance 130. If the proximity-sensing device 104 detects movement of a user 106 within the short-range distance 130, the proximity-sensing device 104 may determine to increase the pulse spacing (i.e., reduce frame rate) in order to limit the power usage while the proximity-sensing device 104 tracks the user while the user is within the short-range distance 130. In this case, however, the user 106 is not within the short-range distance 130.

At 140, the proximity-sensing device 104 may transition into a mid-range process. In the mid-range process, the proximity-sensing device 104 may increase the pulse width of the pulsed ultrasonic signals 114 (e.g., 6 ms, 8 ms, etc.) to result in mid-range signals in order to increase the SNR ratio for the reflection of the signals off objects within the mid-range distance 132 (e.g., 4-8 feet). The proximity-sensing device 104 may emit the mid-range signals in a mid-range detection process to determine whether the user 106 is moving within the mid-range distance 132. At 140, the proximity-sensing device 104 may determine if the user 106 is within the mid-range distance 132 (or short-range distance 130). If the proximity-sensing device 104 detects movement of the user 106 within the mid-range distance 132, the proximity-sensing device 104 may determine to increase the pulse spacing (i.e., reduce frame rate) in order to limit the power usage while the proximity-sensing device 104 tracks the user while the user 106 is within the mid-range distance 132. In this case, however, the user 106 is not within the mid-range distance 132.

At 144, the proximity-sensing device 104 may transition into a long-range process. In the long-range process, the proximity-sensing device 104 may increase the pulse strength of the pulsed ultrasonic signals 114 (e.g., 55 dB, 60 dB, etc.) to result in long-range signals in order to increase the SNR ratio for the reflection of the signals off objects within the long-range distance 134 (e.g., 8 feet or further). In some instances, the proximity-sensing device 104 may additionally reduce the pulse width of the long-range signals to help preserve power. In some examples, the pulse strength of the long-range signals may be increased by a factor (e.g., 50% increase, 75% increase, etc.) from the mid-range signals, and the pulse width may be reduced by the same factor as compared to the mid-range signals (and may be the same as the pulse width for the short-range signals, in some instances). The proximity-sensing device 104 may emit the long-range signals in a long-range detection process to determine whether the user 106 is moving within the long-range distance 134. If the proximity-sensing device 104 detects movement of the user 106 within the long-range distance, the proximity-sensing device 104 may determine to increase the pulse spacing (i.e., reduce frame rate) in order to limit the power usage while the proximity-sensing device 104 tracks the user 106 while the user 106 is within the long-range distance 134.

Upon being emitted, the pulsed ultrasonic signals 114 will generally reflect off of objects in the home 102. The proximity-sensing device 104 may use the microphone(s) 112 to generate audio data representing the reflected ultrasonic signal 122. Generally, the audio data (or other type of data, such as energy data) may represent reflections signals 122 of individual pulsed ultrasonic signals 114 in respective frames, or periods of time in which reflections 122 from one of the pulsed ultrasonic signals 114 are primarily or entirely represented in the audio data. The frames may be represented in data in that an individual frame begins before, during, or right after a pulsed ultrasonic signal 114 is emitted, continues during the "off" cycle when reflection signals 122 are reflecting off objects and back towards the device 104, and ends in the off cycle and before a next pulsed ultrasonic signal 114 is going to be emitted. In this way, a frame of the audio data represents reflection signals 122 corresponding to one pulsed ultrasonic signal 114, and represent energy measurements for the reflection signals 122 when received back at the device 104.

The proximity-sensing device 104 may detect changes in energy of reflected signals across frames representing the reflections 122 of the pulsed ultrasonic signals 114. For instance, the proximity-sensing device 104 may analyze the audio data on a frame-by-frame basis and determine energy data for each frame representing energy measurements for each reflection signal 122. The energy measurements may represent the energy of a reflection signal 122, such as a strength of the reflection signal 122, when that signal 122 is received by the microphone 112 of the proximity-sensing device 104. The audio data may represent the reflection signals 122 as continuous-time signals that have a varying amplitude over time. Generally, the energy of a signal corresponds or is correlated to the total magnitude of the signal, and the proximity-sensing device may determine energy values for the reflected signals using various algorithms and the audio data as described below. In addition to determining the energy values, the proximity-sensing device 104 may identify and track the times at which the reflected signals 122 were received back at the device 104 and map those times to the respective energy values for that reflected signal 122. Thus, the proximity-sensing device 104 determines the ToF values for reflected signals 122, and map those ToF values to the energy values for the reflected signals 122.

The proximity-sensing device 104 may distinguish between user and non-user objects. Generally, non-user objects include static objects in the environment (e.g., non-moving objects such as furniture, walls, etc.), as well as moving objects, but non-user objects (e.g., ceiling and floor fans, blinds or other items blowing in the wind from an open window, etc.). The proximity-sensing device 104 may determine that some objects are static in that the energy values for signals reflecting off those objects do not change across different frames. However, the proximity-sensing device 104 may further determine that there are objects moving in that energy values are changing across frames. The proximity-sensing device 104 may disambiguate between users 106 that are moving in the environment and objects that are moving, but are not user 106. For instance, the proximity-sensing device 104 may determine that objects that are moving in the environment are not changing position based on the ToF values for the reflected signals 122. That is, a ceiling fan or house plant blowing in the wind may have changes in energy values across frames, but the ToF values for those changes in energy values may not significantly change over time which indicates that the mov objects are staying in a same location, or substantially the same location, in the environment.

In the long-range detection process, the proximity-sensing device 104 may determine a movement direction and proximity of the user 106 relative to the proximity-sensing device 104. For instance, the proximity-sensing device 104 may compare the energy measurements and ToF values for reflected signals 122 across multiple frames, such as frames that represent two pulsed ultrasonic signals 114 that were emitted in sequence with each other. Stated otherwise, the reflected signals 122 that have the same, or similar, ToF and/or energy measurements in sequential frames are likely bouncing off the same objects because the difference in time across frames is on the order of milliseconds. Based on that comparison, the proximity-sensing device 104 may determine which of the reflected signals 122 had the largest change in energy across the frames. A change in energy indicates a change in the distance between the device 104 and object off which the reflected signal 122 is reflecting. Thus, the largest change in energy values across frames will correspond to the largest moving object in the environment, such as the user 106. In this way, the proximity-sensing device 104 may determine that the user 106 is moving in the home 102.

Further, the proximity-sensing device 104 may continue to track the movement of the user 106 in the home 102. For instance, the proximity-sensing device 104 may continue to emit pulsed ultrasonic signals 114, generate new frames of audio data, and determine new ToF values and energy measurement changes for the user 106. The proximity-sensing device 104 can determine whether the ToF values are increasing, indicating that the user 106 is moving away from the device 104, or decreasing which indicates that the user 106 is moving towards the device 104 (as is the case in this example). If the user 106 moves into different distances or ranges, the proximity-sensing device 104 may begin emitting the pulsed ultrasonic signals 114 using the signal parameters that are appropriate or suited for the distance/range in which the user 106 is located.

The proximity-sensing device 104 may perform various operations based on the determinations made herein, such as a proximity/distance of the user 106 relative to the device, whether the user 106 is moving towards or away from the device 104, and/or whether multiple users are in a room. For instance, the proximity-sensing device 104 may cause various secondary devices 108 to turn on or off (e.g., lights, television, security alarm, etc.), optimize the output of music data to create auditory "sweet spots" for the user 106 as they move through the home 102, perform more effective beam-forming techniques based on the location and/or movement of the user 106, and so forth. In one illustrative example, the proximity-sensing device 104 may determine whether the user 106 is within a threshold distance (e.g., 3 feet, 4 feet, etc.) to the proximity-sensing device 104 that has a display. If the user 106 is within the threshold distance, the proximity-sensing device 104 may cause content to be presented on the display, or change a size of the content being displayed. For example, if the user 106 moves within the threshold distance of the proximity-sensing device 104, the device 104 may change the font size of text or size of images, change the brightness of content on the display, change what is presented on the display, start outputting content on the display (e.g., show the time or weather), and/or perform other operations.

Figure 2:
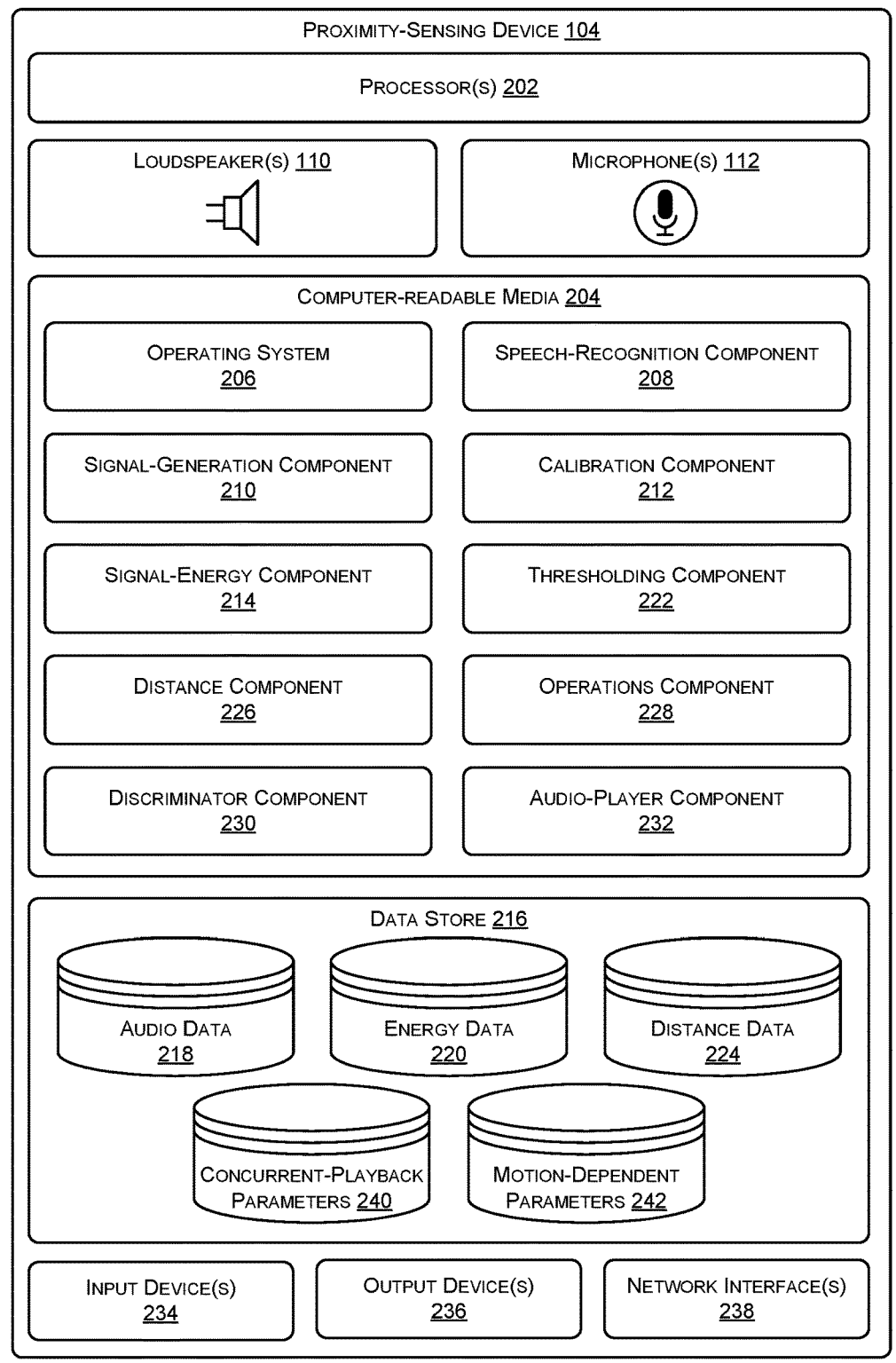
FIG. 2 illustrates an example component diagram of a proximity-sensing device.

FIG. 2 illustrates an example component diagram 200 of a proximity-sensing device 104. Generally, the proximity-sensing device 104 may comprise any type of device, such as a fixed computing device (e.g., light switch, appliance, etc.), a display device (e.g., television, screen interface device, etc.) and/or a portable or mobile device such as voice-controlled devices, smartphones, tablet computers, media players, personal computers, wearable devices, various types of accessories, and so forth.

The proximity-sensing device 104 may include one or more processors 202 configured to execute various computer-executable instructions stored on the proximity-sensing device 104. Further, the proximity-sensing device 104 may include one or more loudspeakers 110 positioned at one or more locations on the proximity-sensing device 104. The loudspeakers 110 may include one loudspeaker 110, and/or an array of loudspeakers configured to coordinate the output of sound. The loudspeakers 110 may comprise any type of electroacoustic transducer which converts an electronic audio signal (e.g., audio data) into corresponding sound represented by the audio signal. In some examples, the loudspeaker(s) 110 may be simple onboard speakers designed to output sound in frequency ranges that are audible to humans, rather than being specialized ultrasonic transducers. However, in other examples the loudspeaker(s) 110 may be specialized ultrasonic transducers depending on the proximity-sensing device 104.

The proximity-sensing device 104 may further include the microphones 112 that comprise one or more microphones which may include transducers that convert sound into an electrical audio signal. The microphones 112 may include any number of microphones that are arranged in any pattern. For example, the microphones 112 may be arranged in a geometric pattern, such as a linear geometric form, circular geometric form, or any other configuration. As an example, an array of four microphones may be placed in a circular pattern at 90-degree increments (e.g., 0, 90, 180, 270) to receive sound from four directions. The microphones 112 may be in a planar configuration, or positioned apart in a non-planar three-dimensional region. In some implementations, the microphones 112 may include a spatially disparate array of sensors in data communication. For example, a networked array of sensors may be included. The microphones 112 may include omni-directional microphones, directional microphones (e.g., shotgun microphones), and so on.

The proximity-sensing device 104 may further include computer-readable media 204 that may be used to store any number of software and/or hardware components that are executable by the processor(s) 202. Software components stored in the computer-readable media 204 may include an operating system 206 that is configured to manage hardware and services within and coupled to the proximity-sensing device 104. The computer-readable media may store a speech-recognition component 208 that, when executed by the processor(s) 202, perform speech-recognition on processed audio signal(s) to identify one or more voice commands represented therein. For instance, the speech-recognition component 208 may convert the audio signals into text data using automatic-speech recognition (ASR), and determine an intent for voice commands of the user 106 using natural-language understanding (NLU) on the text data. Thereafter, a command processor, stored in the computer-readable media 204 (and/or at a remote network-based system), may cause performance of one or more action in response to identifying an intent of the voice command. In the illustrated example, for instance, the command processor may issue an instruction to control a secondary device 108. For instance, the command processor may issue one or more instructions to the television 108(1) to show the weather channel, sends an instruction to dim the light 108(2), and/or output music using a loudspeaker 110.

The computer-readable media 204 may further store a signal-generation component 210 that, when executed by the processor(s) 202 generate audio signals/data that represent sound to be output by the loudspeaker(s) 110. The signal-generation component 210 may, for example, generate audio data representing ultrasonic signals that are output by the loudspeaker(s) 110 at a frequency that is above the audible range of humans. The signal-generation component 210 may generate ultrasonic signals at various power levels depending on, for example, a size of a room that the proximity-sensing device 104 is in. Further, the signal-generation component 210 may generate ultrasonic signals that are converted into sound by the loudspeaker(s) 110 according to various timing implementations, such as a pulsed sound, a periodically pulsed sound, etc. The signal-generation component 210 may generate pulsed ultrasonic signals 114 according to various waveforms, such as various duty cycles of on or off.

The computer-readable media 204 may further store a calibration component 212 configured to, when executed by the processor(s) 202, determine audio characteristics of an environment of the proximity-sensing device 104 and/or frequencies at which to output sound by the loudspeaker(s) 110. In some examples, the calibration component 212 may cause the signal-generation component 210 to generate audio data representing a calibration tone, such as an ultrasonic sweep signal, to determine audio characteristics of the environment of the proximity-sensing device 104. The calibration component 212 may perform device calibration to determine an optimal frequency range for ultrasonic signals to be emitted by the loudspeaker(s) 110 into the environment. In some examples, the calibration component 212 may cause the signal-generation component 210 to generate an ultrasonic sweep signal that, when converted into sound by the loudspeaker(s) 110, emits a sound over a period of time at a range of ultrasonic frequencies (e.g., 27 kHz-40 kHz). The calibration component 212 may also activate at least one microphone in the microphones 112 to generate audio data representing the ultrasonic sweep signal, and determine an optimal frequency range/bin for the environment. For instance, the calibration component 212 may analyze various frequency ranges included in the total frequency range of the ultrasonic sweep signal and determine signal-to-noise (SNR) values for one or more frequency ranges. The calibration component 212 may determine which sub-frequency range in the total frequency range of the ultrasonic sweep signal has the best SNR value. In some examples, the calibration component 212 may cause utilize the ultrasonic sweep signal upon installation of the proximity-sensing device 104, after detecting movement, or the end of movement, using a sensor of the proximity-sensing device 104, and/or periodically in order to determine an optimal frequency at which to emit ultrasonic signals into an environment of the proximity-sensing device 104.

The computer-readable media 204 may further include a signal-energy component 214 that, when executed by the processor(s) 202, perform various operations for processing audio data 218 to determine energy data 220 that represents energy measurements for reflections 122 of the pulsed ultrasonic signals 114. The audio data 218 may represent the reflection signals 122 as continuous-time signals that have a varying amplitude over time. Generally, the energy of a signal corresponds or is correlated to the total magnitude of the signal, and the proximity-sensing device may determine energy values for the reflected signals using various algorithms and the audio data as described below. In one example, to determine the energy data using the audio data, the proximity-sensing device may determine the root-mean-square energy (RMSE) values for the signals. The RMSE values may be placed or grouped into "bins" that represent energy measurements for reflections 122 receives over time. In another example, the signal-energy component 214 may use a Hilbert transform, or another transform that determines higher-order differences in the frames to compute the energy of fluctuations.

The computer-readable media 204 may further include a thresholding component 222 that, when executed by the processor(s) 202, perform various operations for signals that represent targets that are static or stationary, or "noise" signals. For instance, the thresholding component 222 may apply a threshold to remove a portion of the unwanted energy data 220, such as 90% of the unwanted energy data 220 being removed. In this way, the thresholding component 222 may isolate the energy data 220 that represents the largest changes in energy measurements between frames.

The computer-readable media 204 may further include a distance component 222 that, when executed by the processor(s) 202, perform various operations for determining the distance between the proximity-sensing device 104 and a user 106. For instance, the distance component 222 may use ToF values (or roundtrip time) based on when the pulsed ultrasonic signals 114 are emitted and when the reflected ultrasonic signals 122 are received. The ToF values are generally representative of distance with respect to sound signals or waves because the sound waves move at the speed of sound (e.g., 343 m/s), and ToF and speed of sound can be used to easily calculate distance. Thus, the distance component 222 may use Equation 1, shown below, to determine distances between the proximity-sensing device 104 and the user 106, wherein "d" is the distance between the user 106 and the proximity-sensing device 104, "c" is the speed of sound, and "t" is the ToF of the signal:

$$d = c\left(\frac{t}{2}\right) \quad \text{Equation 1}$$

Thus, using these ToF values, the distance component 226 may determine distances for reflected signals in different frames that have been reflected off a moving user 106. The distance component 226 may store the distances in the distance data 224 of the data store 216. Using different distances tracked over various frames and period of time, the distance component 226 can determine a movement direction of the user 106 (e.g., towards the device, away from the device, substantially parallel with the device, around the device, etc.). Further, the distance component 226 may determine whether the user 106 is within a threshold proximity or distance to the proximity-sensing device 104.

The computer-readable media 204 may further include an operations component 228 that, when executed by the processor(s) 202, perform various operations based on the determinations made herein, such as a proximity/distance of the user 106 relative to the device 104, whether the user 106 is moving towards or away from the device 104, and/or whether multiple users 106 are in a room. For instance, the operations component 228 may cause various secondary devices to turn on or off (e.g., lights, television, security alarm, etc.), optimize the output of music data to create auditory "sweet spots" for the person as they move through the room, perform more effective beamforming techniques based on the location and/or movement of the user 106, and so forth. In one illustrative example, the proximity-sensing device 104 may determine whether a user is within a threshold distance (e.g., 3 feet, 4 feet, etc.) to a proximity-sensing device 104 that has a display. If the user 106 is within the threshold distance, the operations component 228 may cause content to be presented on the display, or change a size of the content being displayed. For example, if a user 106 moves within the threshold distance of the proximity-sensing device 104, the operations component 228 may change the font size of text or size of images, change the brightness of content on the display, change what is presented on the display, start outputting content on the display (e.g., show the time or weather), and/or perform other operations.

The computer-readable media 204 may further store a discriminator component 230 configured to distinguish between user and non-user objects. Generally, non-user objects include static objects in the environment (e.g., non-moving objects such as furniture, walls, etc.), as well as moving objects, but non-user objects (e.g., ceiling and floor fans, blinds or other items blowing in the wind from an open window, etc.). The discriminator component 230 may determine that some objects are static in that the energy values for signals reflecting off those objects do not change across different frames. However, the discriminator component 230 may further determine that there are objects moving in that energy values are changing across frames. The discriminator component 230 may disambiguate between users 106 that are moving in the environment and objects that are moving, but are not user 106. For instance, the discriminator component 230 may determine that objects that are moving in the environment are not changing position based on the ToF values for the reflected signals 122. That is, a ceiling fan or house plant blowing in the wind may have changes in energy values across frames, but the ToF values for those changes in energy values may not significantly change over time which indicates that the mov objects are staying in a same location, or substantially the same location, in the environment.

The computer-readable media 204 may further store an audio-player component 232 configured to, when executed by the processor(s) 202, cause the processor(s) 202 to play audio such as music songs or other audio files. The audio-player component 232 may cause audio data to be provided to the loudspeaker(s) 110 to be converted into sound. In some examples, prior to providing the audio data to the loudspeaker(s) 110, the audio data may be stored in an audio-data buffer. In such examples, the signal-generation component 210 (or another component) may analyze the audio data stored in the audio-data buffer and determine how to mix the audio data, such as music data, with audio data representing the ultrasonic signal such that the output sound does not experience saturation.

The data store 216 may further store concurrent-play back parameters 240 that are used to emit pulsed ultrasonic signals 114 concurrently with audible sound. For instance, the concurrent-playback parameters 240 may include higher pulse strengths at which to emit the pulsed ultrasonic signals 114 to improve the SNR ratios. In some examples, the concurrent-playback parameters 240 may include shorter pulse widths to help avoid smearing. However, various concurrent-playback parameters 240 may be used to help account for the effects of concurrent audio playback with the pulsed ultrasonic signals 114.

The data store 216 may further store motion-dependent parameters 242 according to which the proximity-sensing device 104 may emit the pulsed ultrasonic signals 114 using that are used based on the type of motion being detected. For instance, the proximity-sensing device 104 may determine if there is major motion (e.g., the user walking towards or away from the device), minor motion (e.g., user washing dishes, cooking food, etc.), or the user is static (e.g., distance is almost constant, such as the user sitting down). The proximity-sensing device 104 may use the motion-dependent parameters 242 based on the different types of motion being detected. As an example, the proximity-sensing device 104 may emit pulsed ultrasonic signals 114 with a higher pulse spacing when major motion has been detected as the user is relatively easy to sense during major motion and less pulses are needed. As another example, the proximity-sensing device 104 may use smaller pulse spacing (higher frame rate) with lower pulse width during minor motion as the movements are more difficult to detect are more frames are necessary. As an even further example, the proximity-sensing device 104 may use higher pulse spacing (low frame rate) when the user is static in order to detect any movements that might be made by the user.

The proximity-sensing device 104 may comprise any type of portable and/or fixed device and include one or more input devices 234 and output devices 236. The input devices 234 may include a keyboard, keypad, lights, mouse, touch screen, joystick, control buttons, etc. The output devices 236 may include a display, a light element (e.g., LED), a vibrator to create haptic sensations, or the like. In some implementations, one or more loudspeakers 110 may function as output devices 236 to output audio sounds.

The proximity-sensing device 104 may have one or more network interfaces 238 such as a wireless or Wi-Fi network communications interface, an Ethernet communications interface, a cellular network communications interface, a Bluetooth communications interface, etc., for communications over various types of networks, including wide-area network, local-area networks, private networks, public networks etc. In the case of a wireless communications interfaces, such interfaces may include radio transceivers and associated control circuits and logic for implementing appropriate communication protocols.

The network interface(s) 238 may enable communications between the proximity-sensing device 104 and the secondary devices 108, as well as other networked devices. Such network interface(s) can include one or more network interface controllers (NICs) or other types of transceiver devices to send and receive communications over a network.

For instance, the network interface(s) 238 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 238 may include a wide area network (WAN) component to enable communication over a wide area network. The networks may represent an array of wired networks, wireless networks, such as WiFi, or combinations thereof.

Figure 3A:
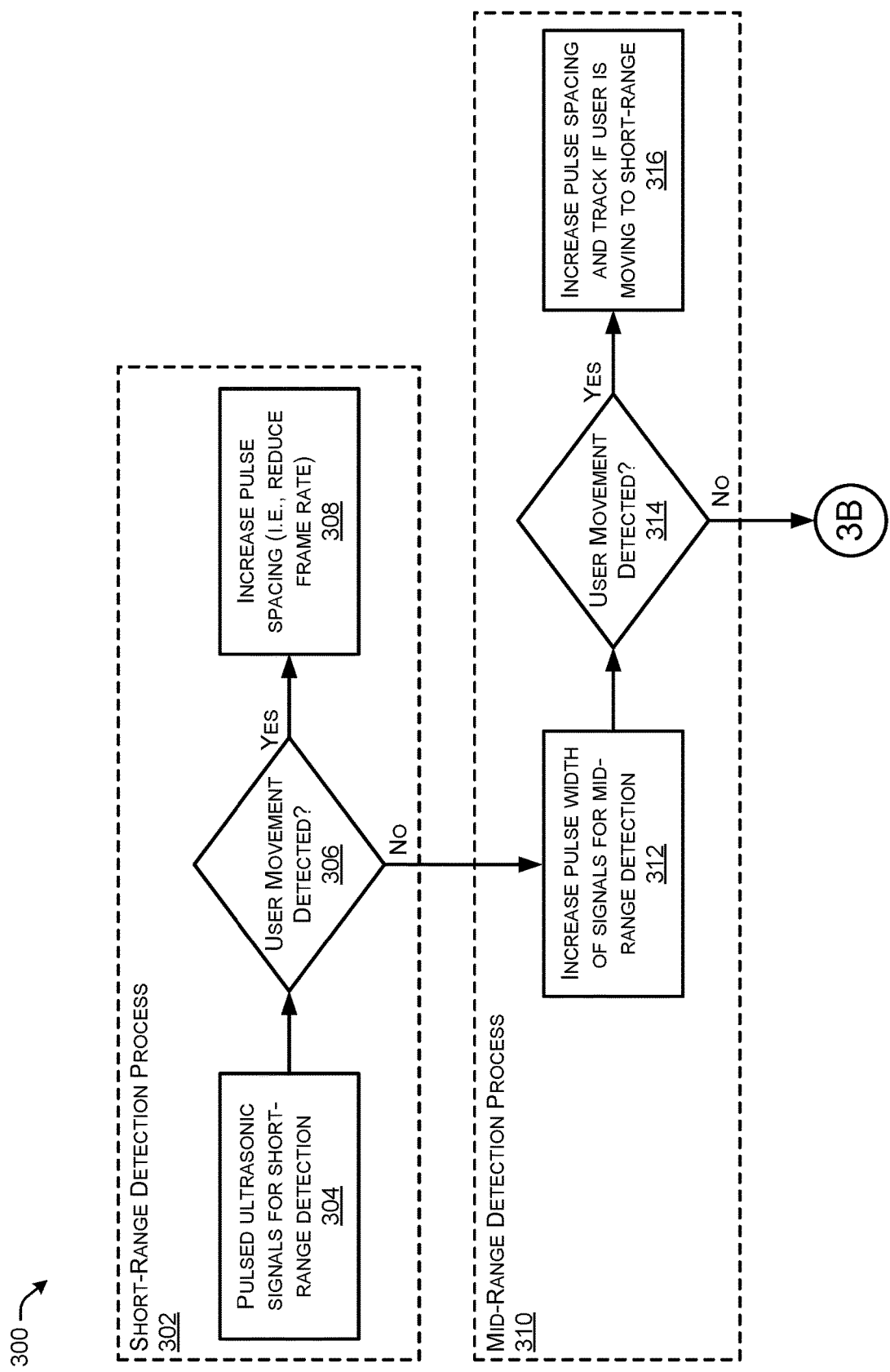
FIGS. 3A and 3B collectively illustrate a high-level process for adapting the signal parameters of pulsed ultrasonic signals based on a distance between the user and the device.
Figure 3B:
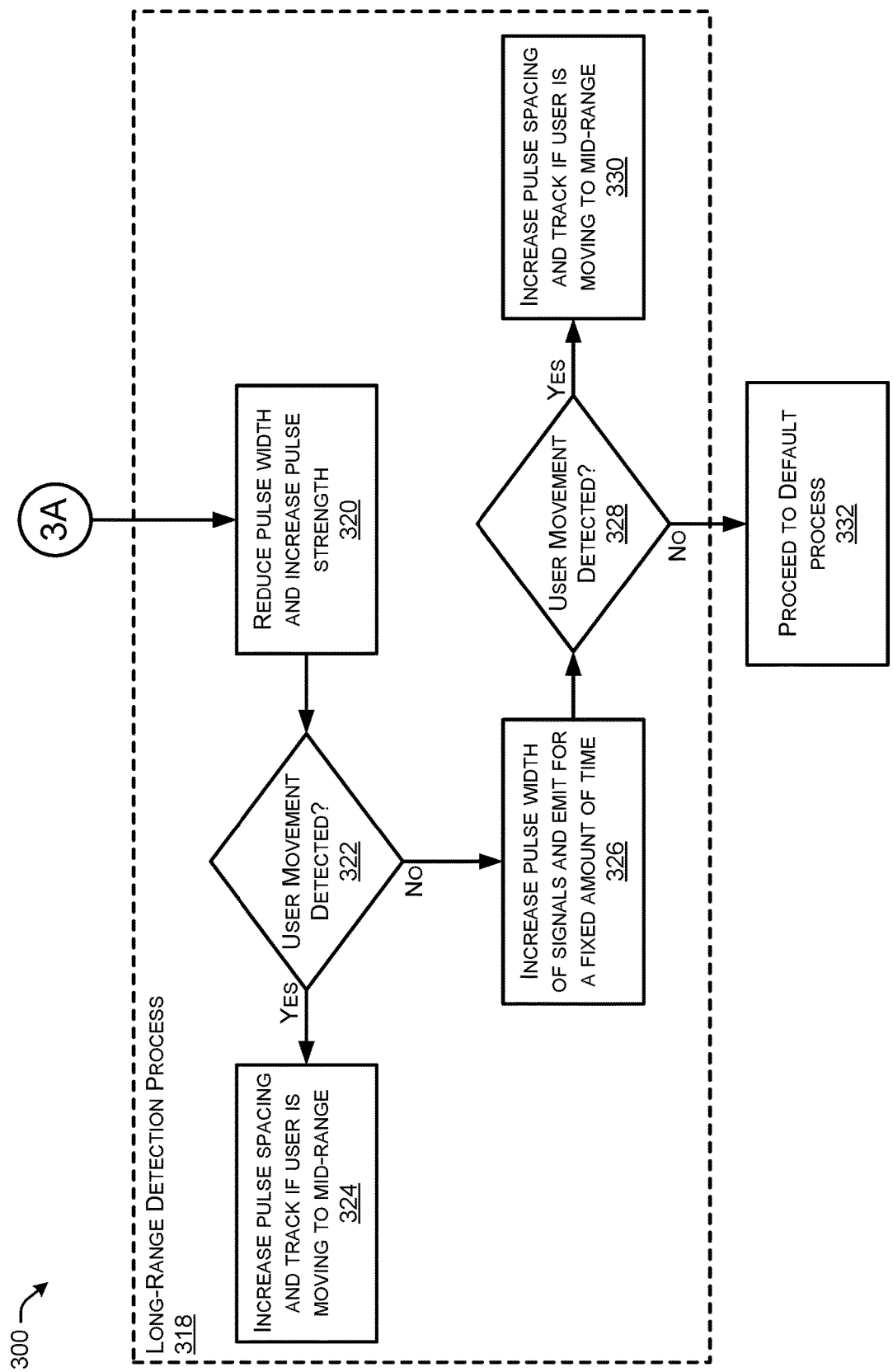

FIGS. 3A and 3B collectively illustrate a high-level process 300 for adapting the signal parameters of pulsed ultrasonic signals 114 based on a distance between the user 106 and the proximity-sensing device 104.

The process 300 begins with a short-range detection process 302 in which the proximity-sensing device 104 emits pulsed ultrasonic signals for short-range detection at 304. At 306, the proximity-sensing device 104 may determine whether user 106 movement was detected. If movement was detected, then the proximity-sensing device 104 may increase the pulse spacing (e.g., from 32 ms to 64 ms). If movement was not detected, the proximity-sensing device 104 may transition into a mid-range detection process 310.

In the mid-range detection process 310, the proximity-sensing device 104 may increase the pulse width of the pulsed ultrasonic signals 114 for mid-range detection at 312. At 314, the proximity-sensing device 104 may determine whether user movement was detected. If user movement was detected, the proximity-sensing device 104 may increase pulse spacing (e.g., 32 ms to 64 ms) and track if the user 106 is moving into the short-range distance. However, if movement was not detected, the proximity-sensing device 104 may enter into a long-range detection process 318.

At 320, the proximity-sensing device 104 may reduce the pulse width and increase the pulse strength (e.g., reduce the pulse width by 50% (from 6 ms to 4 ms), and increase the pulse strength (e.g., from 40 dB to 60 dB). At 322, the proximity-sensing device 104 may determine if user movement has been detected. At 324, if movement is detected in the long-range distance, the proximity-sensing device 104 may increase the pulse spacing and track if the user 106 is moving to the mid-range distance. If movement was not detected, at 326 the proximity-sensing device 104 may increase the pulse width of the signals and emit pulsed ultrasonic signals 114 for a fixed amount of time (e.g., 5 seconds, 30 seconds, etc.). At 328, the proximity-sensing device 104 may determine if movement has been detected using the pulsed ultrasonic signals 114 that are emitted at the higher pulse width and the higher pulse strength. If movement is detected, the proximity-sensing device 104 may, at 330, increase the pulse spacing and track if the user is moving into the mid-range distance. At 332, if the proximity-sensing device 104 does not detect movement, the proximity-sensing device 104 may transition into a default process. In some instances, the default process may be the short-range detection process 302 and the proximity-sensing device 104 may simply move back into the short-range detection process 302. However, in some examples the default process at 332 may include stopping emission of all ultrasonic signals for a period of time, or moving back into the mid-range detection process 310.

Figure 4A:
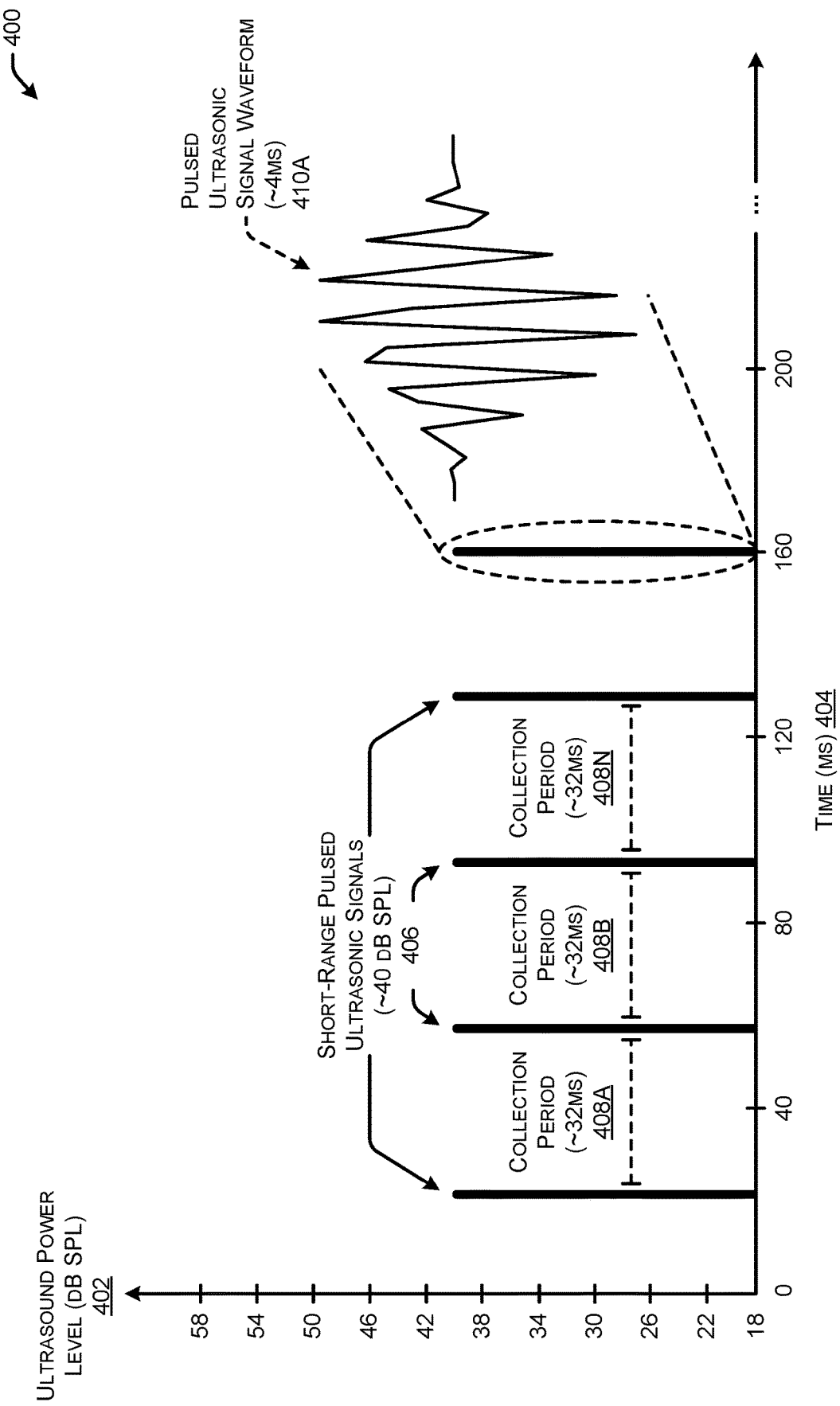
FIGS. 4A-4C illustrate example diagrams depicting emissions of pulsed ultrasonic signals over time, and example signal waveforms of the pulsed ultrasonic signals.

FIG. 4A illustrates an example diagram 400 depicting emissions of pulsed ultrasonic signals 114 over time for short-range detection, and an example signal waveform of a pulsed ultrasonic signal 406.

The diagram includes a chart where short-range pulsed ultrasonic signals 406 are plotted with respect to ultrasound power level 402 (in decibels (dB) sound pressure level (SPL)) and time 404 in milliseconds. As shown, the short-range pulsed ultrasonic signals 406 may be emitted periodically, or according to a duty cycle, and for a duration of approximately 4 ms (other durations may be used). The "off" cycle, or collection period 408 during which reflection signals 122 are collected, may be approximately 32 ms (other durations may be used). In this way, the audio data generated that represents frames including at least the collection period 408 may represent the reflected ultrasonic signals 122 without interference from the short-range pulsed ultrasonic signals 406 (e.g., direct path interference).

FIG. 4A further illustrates a pulsed ultrasonic signal waveform 410A. This is just a sample of what a pulse may look like according to the techniques described herein, and may be emitted in a burst of approximately 4 ms. The pulsed ultrasonic signal waveform 410A is one example of a waveform that could be used, but any waveform could be used for the pulsed ultrasonic signals 406 and the pulse waveform 410A is configurable, such as Gaussian window pulses, Hanning window pulses, and/or any other type of pulse waveform.

Figure 4B:
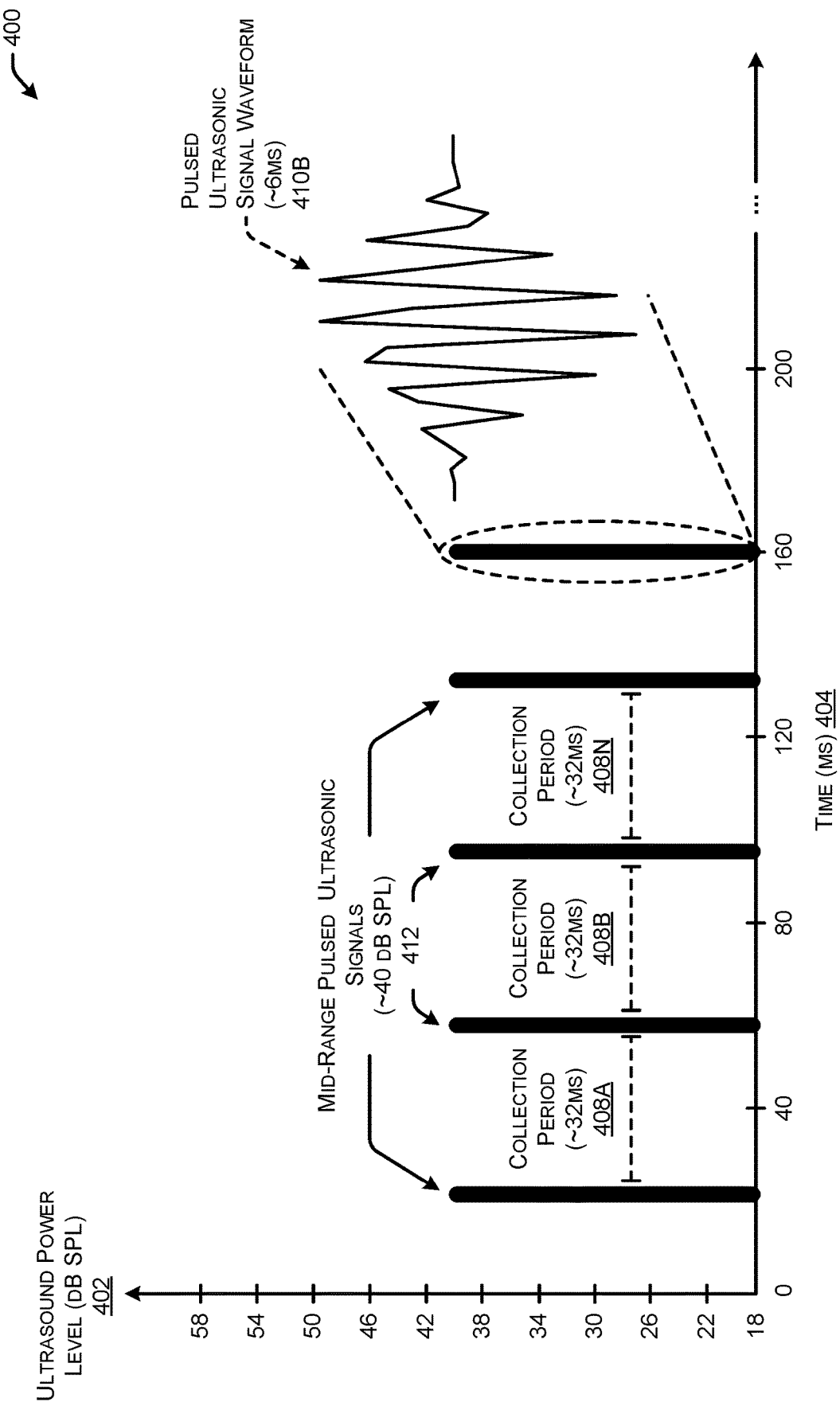

FIG. 4B illustrates an example diagram 400 depicting emissions of pulsed ultrasonic signals 114 over time for mid-range detection, and an example signal waveform of a mid-range pulsed ultrasonic signals 412.

The diagram includes a chart where mid-range pulsed ultrasonic signal 412 are plotted with respect to ultrasound power level 402 (in decibels (dB) sound pressure level (SPL)) and time 404 in milliseconds. As shown, the mid-range pulsed ultrasonic signals 412 may be emitted periodically, or according to a duty cycle, and for a duration of approximately 6 ms (other durations may be used). The "off" cycle, or collection period 408 during which reflection signals 122 are collected, may be approximately 32 ms (other durations may be used). In this way, the audio data generated that represents frames including at least the collection period 408 may represent the reflected ultrasonic signals 122 without interference from the mid-range pulsed ultrasonic signals 412 (e.g., direct path interference).

FIG. 4B further illustrates a pulsed ultrasonic signal waveform 410B. This is just a sample of what a pulse may look like according to the techniques described herein, and may be emitted in a burst of approximately 6 ms. The pulsed ultrasonic signal waveform 410B is one example of a waveform that could be used, but any waveform could be used for mid-range pulsed ultrasonic signals 412 and the pulse waveform 410B is configurable, such as Gaussian window pulses, Hanning window pulses, and/or any other type of pulse waveform.

Figure 4C:
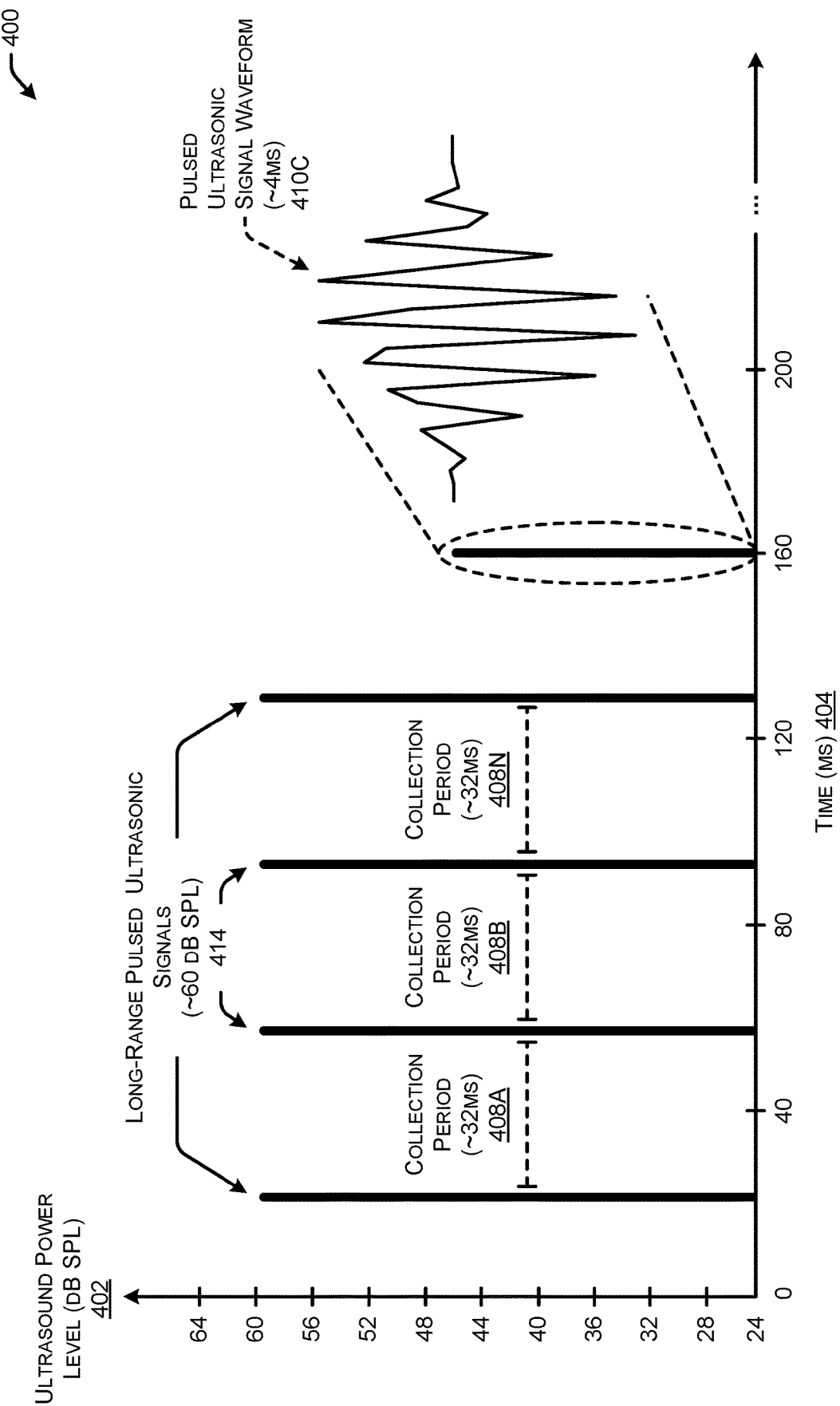

FIG. 4C illustrates an example diagram 400 depicting emissions of pulsed ultrasonic signals 114 over time for mid-range detection, and an example signal waveform of a long-range pulsed ultrasonic signals 412.

The diagram includes a chart where long-range pulsed ultrasonic signals 412 are plotted with respect to ultrasound power level 402 (in decibels (dB) sound pressure level (SPL)) and time 404 in milliseconds. As shown, the long-range pulsed ultrasonic signals 412 may be emitted periodically, or according to a duty cycle, and for a duration of approximately 6 ms (other durations may be used). The "off" cycle, or collection period 408 during which reflection signals 122 are collected, may be approximately 32 ms (other durations may be used). In this way, the audio data generated that represents frames including at least the collection period 408 may represent the reflected ultrasonic signals 122 without interference from the long-range pulsed ultrasonic signals 412 (e.g., direct path interference).

FIG. 4C further illustrates a pulsed ultrasonic signal waveform 410C. This is just a sample of what a pulse may look like according to the techniques described herein, and may be emitted in a burst of approximately 4 ms and a pulse strength of approximately 60 dB SPL. The pulsed ultrasonic signal waveform 410C is one example of a waveform that could be used, but any waveform could be used for long-range pulsed ultrasonic signals 412 and the pulse waveform 410C is configurable, such as Gaussian window pulses, Hanning window pulses, and/or any other type of pulse waveform.

It should be appreciated that the pulsed ultrasonic signals described in FIGS. 4A-4C are illustrated as being emitted with various pulsed signal parameters. These values are illustrative, but the values are configurable and other values or ranges of values may be used. For example, the pulse widths may range from 0.5 ms up to 10 ms, or higher in some examples. The pulse widths may be calibrated based on the device and/or hardware and be selected as providing the best, or optimal, SNR values for reflection signals. Further, the collection periods may differ than those illustrated. Generally, however, it may be advantageous to have the collection periods be at least twice the length of the pulse width to allow for sufficient time to receive the reflections of the pulsed signals.

FIG. 5A illustrates an example energy echogram 500 that illustrates energy measurements of reflection signals 122 correspond to reflections of pulsed ultrasonic signals 114 that reflected off a moving object in an environment.

The energy echogram 500 illustrates energy measurements 506 are plotted with respect to signal energy 502 and time 504 in milliseconds. As shown, the energy measurements 506 may indicate a representation of the direct path energy 508, as well as a moving object 510 energy. Further, the echogram 500 indicates an energy threshold 512 that is used to remove unwanted energy changes from further processing.

Figure 5B:
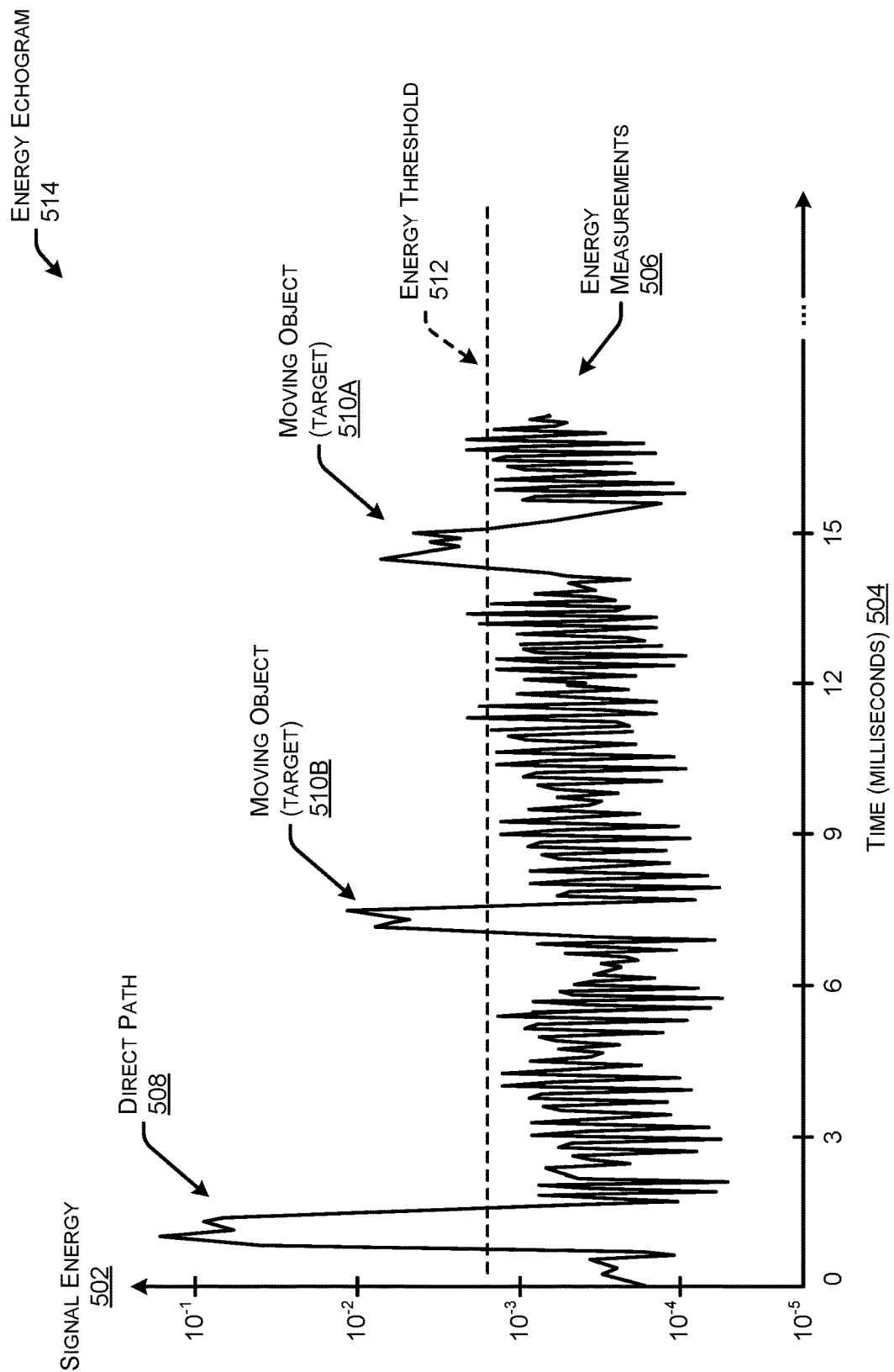
FIG. 5B illustrates an example energy echogram that illustrates energy measurements of reflection signals correspond to reflections of pulsed ultrasonic signals that reflected off multiple moving objects in an environment.

FIG. 5B illustrates an example energy echogram 514 that illustrates energy measurements 506 of reflection signals 122 correspond to reflections of pulsed ultrasonic signals 114 that reflected off multiple moving objects in an environment.

The energy echogram 514 illustrates energy measurements 506 are plotted with respect to signal energy 502 and time 504 in milliseconds. As shown, the energy measurements 506 may indicate a representation of the direct path energy 508, as well as a first moving object 510A energy as well as a second moving object 510B energy that is at a different ToF value. Further, the echogram 514 indicates the energy threshold 512 that is used to remove unwanted energy changes from further processing.

Figure 6:
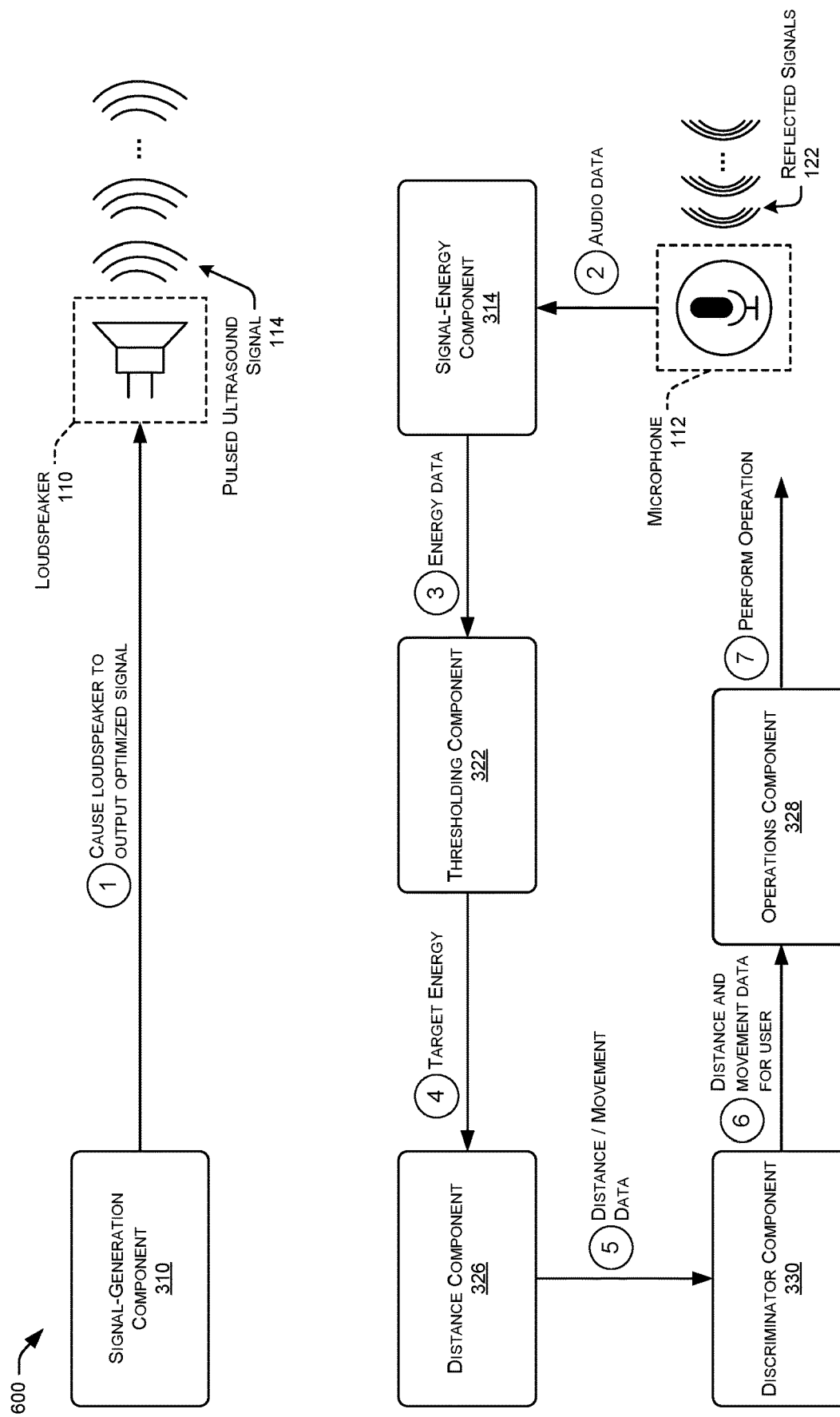
FIG. 6 illustrates an example high-level process for generating and emitting pulsed ultrasonic signals into an environment, and analyzing audio data representing reflections of the ultrasonic signal off objects in the environment to detect proximity and/or direction of movement of a user.

FIG. 6 illustrates an example high-level process 600 for generating and emitting pulsed ultrasonic signals 114 into an environment, and analyzing audio data 218 representing reflections of the ultrasonic signal off objects in the environment to detect proximity and/or direction of movement of a user 106.

At "1," the proximity-sensing device may use the loudspeaker to periodically, or continuously, emit pulsed ultrasonic signals 114 (e.g., frequencies above 20 kHz) into the room to determine if one or more users 106 are moving in the room and a direction of movement. The proximity-sensing device may use the loudspeaker to emit pulsed ultrasonic signals at a determined duty cycle. For example, the loudspeaker may emit pulsed ultrasonic signals, or short "bursts" of ultrasonic sound (e.g., 1 millisecond (ms), 5 ms, etc.), for an "on" portion of the duty cycle, and may then stop emitting ultrasonic sound, or greatly reduce the power at which ultrasonic sound is being emitted, for an "off" portion of the duty cycle (e.g., 25 ms, 50 ms, etc.).

At "2," the microphone 112 may receive reflected signals 122 and generate audio data 218 representing reflection signals 122 using the microphone 112. Generally, the audio data 218 may represent reflections of individual pulsed ultrasonic signals in respective "frames," or periods of time in which reflections from one of the pulsed ultrasonic signals are primarily or entirely represented in the audio data.

At "3," the signal-energy component 214 may analyze the audio data 218 on a frame-by-frame basis and determine energy data 220 for each frame representing energy measurements for each reflection signal 122. The energy measurements may represent the energy of a reflection signal when that signal is received by the microphone of the proximity-sensing device.

At "4," the thresholding component 222 may remove reflected signals 122 that have respective energy measurements or changes in energy that are below a threshold (e.g., remove 90%, 80%, etc. of signals).

At "5", the distance component 226 may receive or identify the ToF values for reflected signals 122, and map those ToF values to the energy values for the reflected signals 122. The ToF is generally representative of distance with respect to sound signals or waves because the sound waves move at the speed of sound (e.g., 343 m/s), and ToF and speed of sound can be used to easily calculate distance. Thus, the distance component 226 may determine the distance of the user 106 from the device 104.

At "6," the discriminator component 230 may distinguish between user and non-user objects. Generally, non-user objects include static objects in the environment (e.g., non-moving objects such as furniture, walls, etc.), as well as moving objects, but non-user objects (e.g., ceiling and floor fans, blinds or other items blowing in the wind from an open window, etc.). The discriminator component 230 may determine that some objects are static in that the energy values for signals reflecting off those objects do not change across different frames. However, the discriminator component 230 may further determine that there are objects moving in that energy values are changing across frames. The discriminator component 230 may disambiguate between users 106 that are moving in the environment and objects that are moving, but are not user 106. For instance, the discriminator component 230 may determine that objects that are moving in the environment are not changing position based on the ToF values for the reflected signals 122. That is, a ceiling fan or house plant blowing in the wind may have changes in energy values across frames, but the ToF values for those changes in energy values may not significantly change over time which indicates that the mov objects are staying in a same location, or substantially the same location, in the environment.

At "7," the operations component 228 may perform various operations, such as causing various secondary devices to turn on or off (e.g., lights, television, security alarm, etc.), optimize the output of music data to create auditory "sweet spots" for the person as they move through the room, perform more effective beamforming techniques based on the location and/or movement of the user, and so forth. In one illustrative example, the proximity-sensing device may determine whether a user is within a threshold distance (e.g., 3 feet, 4 feet, etc.) to a proximity-sensing device that has a display. If the user is within the threshold distance, the proximity-sensing device may cause content to be presented on the display, or change a size of the content being displayed.

Figure 7:
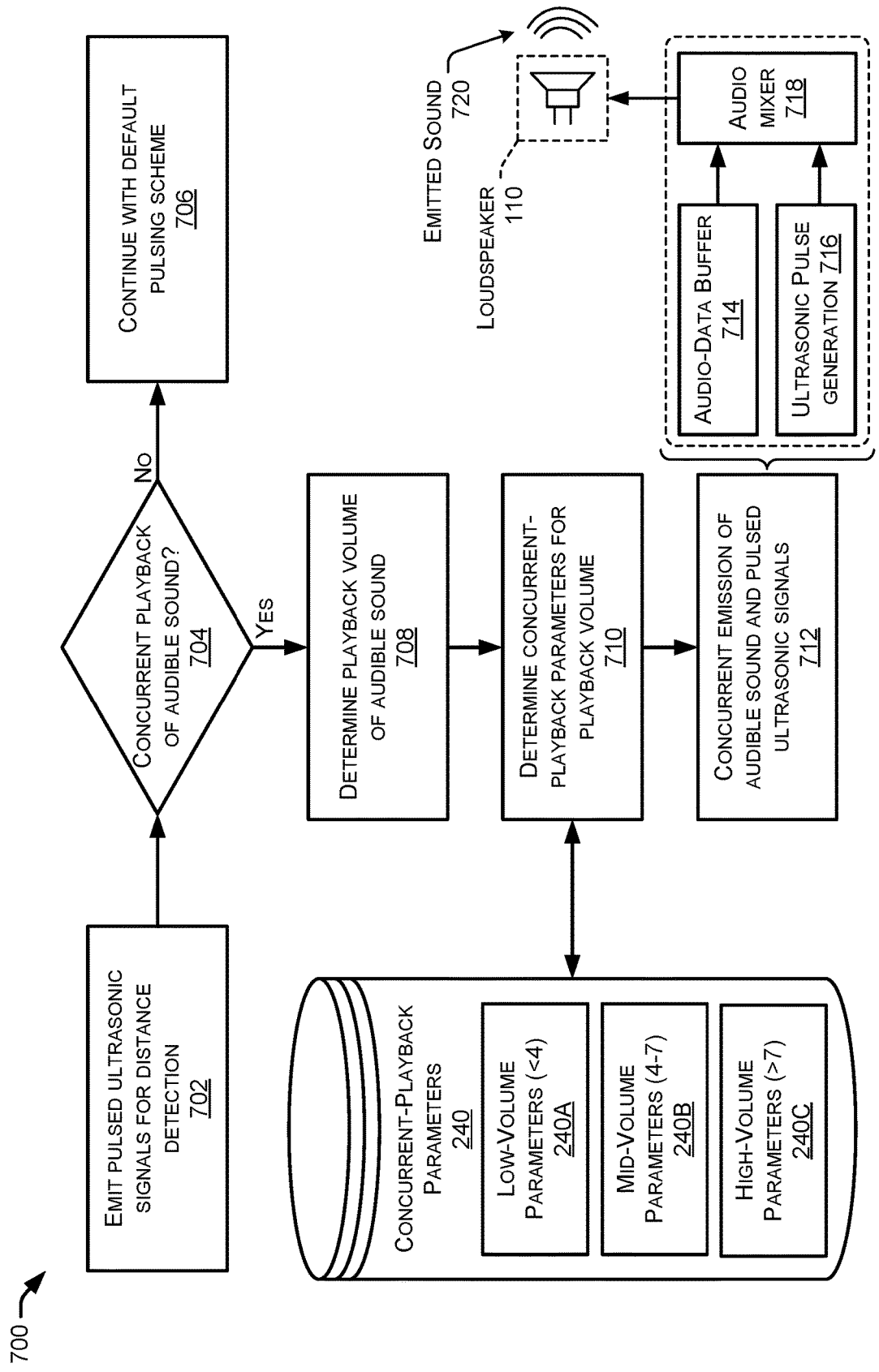
FIG. 7 illustrates an example high-level process for determining concurrent-playback parameters for pulsed ultrasonic signals based on a volume at which audible sound is being emitted by a loudspeaker of a proximity-sensing device.

FIG. 7 illustrates an example high-level process 700 for determining concurrent-playback parameters 240 for pulsed ultrasonic signals 114 based on a volume at which audible sound is being emitted by a loudspeaker 110 of a proximity-sensing device 104.

At 702, the proximity-sensing device 104 may emit pulsed ultrasonic signals for distance detection. At 704, the proximity-sensing device 104 may determine if there is concurrent playback of audible sound on the loudspeaker 110. If the proximity-sensing device 104 determines that there is not concurrent playback, the proximity-sensing device 104 may continue with the default pulsing scheme at 706 (pulsing scheme described herein).

However, at 708, the proximity-sensing device 104 may determine that concurrent playback is occurring and determine a playback volume of the audible sound. At 710, the proximity-sensing device 104 may determine concurrent-playback parameters 240 that are appropriate for the playback volume. At 712, the proximity-sensing device 104 may concurrently emit the audible sound and pulsed ultrasonic signals 114 using the concurrent-playback parameters 240.

In some instances, the proximity-sensing device may output audible sound to users, such as music, news briefings, and/or responses as part of a dialogue with the user. The proximity-sensing device may wish to output the pulsed ultrasonic signals concurrently with the audible sound in order to do proximity sensing. However, concurrent output of the audible sound with the pulsed ultrasonic signals can have various negative effects on the performance of the proximity-sensing processes, such as by increasing the amount of noise in the generated audio data and smearing of the pulsed ultrasonic signals. To account for this, the proximity-sensing device may receive and store concurrent-playback parameters 240 that are used to emit ultrasonic signals concurrently with audible sound. For instance, the concurrent-playback parameters 240 may include higher pulse strengths at which to emit the pulsed ultrasonic signals to improve the SNR ratios. In some examples, the concurrent-play back parameters 240 may include shorter pulse widths to help avoid smearing. However, various concurrent-playback parameters 240 may be used to help account for the effects of concurrent audio playback with the pulsed ultrasonic signals.

The concurrent-playback parameters 240 may indicate one or more of specific pulse widths, pulse strengths, and/or pulse spacing for pulsed ultrasonic signals based on the volume of concurrent playback being a low volume (e.g., <4 on a scale of 1-10 for volume), a mid-volume (e.g., 4-7 on a scale of 1-10 for volume), or a high-volume (e.g., >7 on a volume scale from 1-10). In some examples, as the volume of the audible sound increases, the pulse strength may increase to achieve suitable SNR for the reflection signals and proximity sensing.

Figure 8:
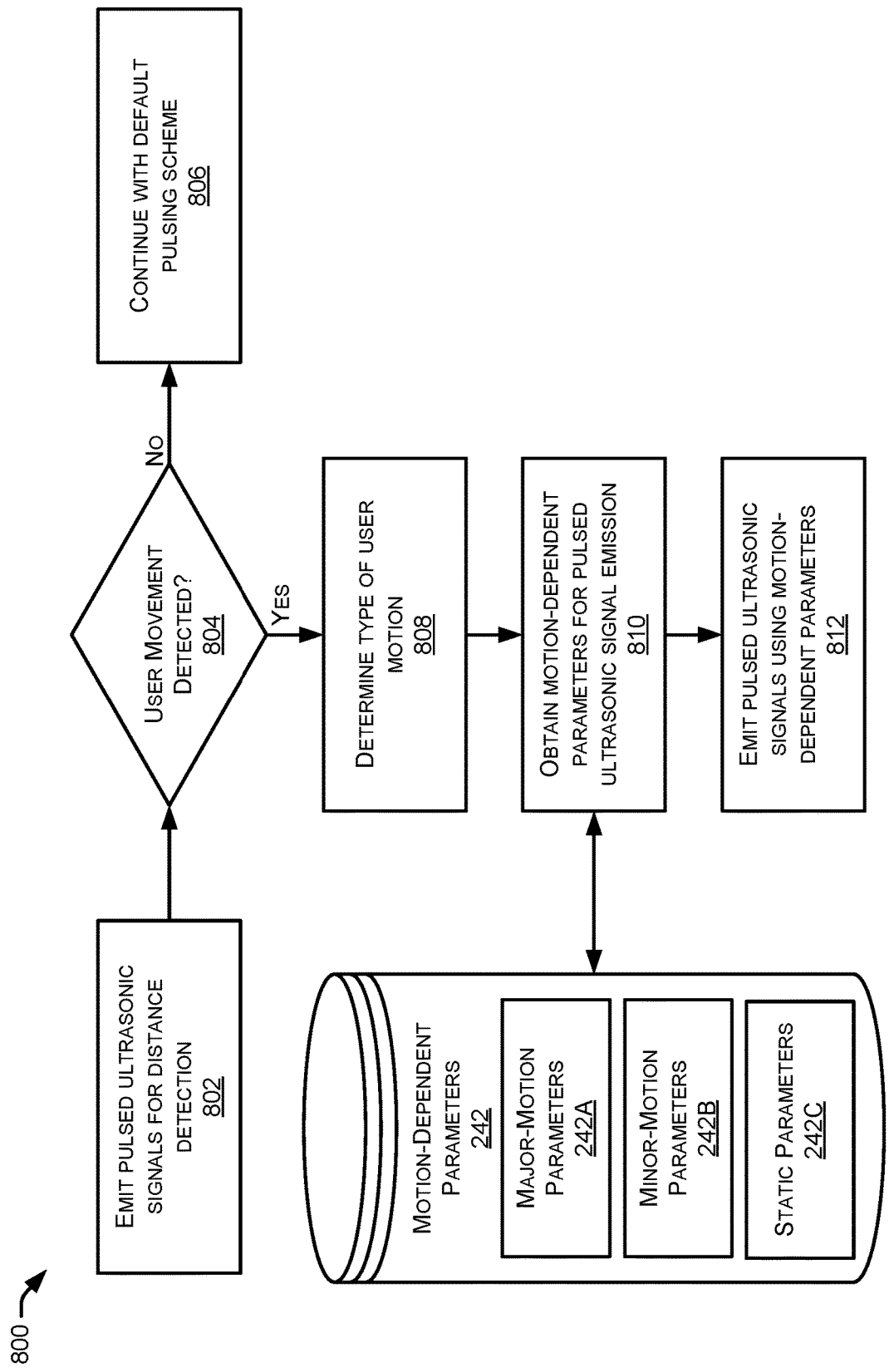
FIG. 8 illustrates an example high-level process for determining motion-dependent parameters for pulsed ultrasonic signals based on a type of user motion.

FIG. 8 illustrates an example high-level process 800 for determining motion-dependent parameters 242 for pulsed ultrasonic signals 114 based on a type of user motion.

At 802, the proximity-sensing device 104 may emit pulsed ultrasonic signals for distance detection. At 804, the proximity-sensing device 104 may determine if user movement has been detected. If the proximity-sensing device 104 determines that there is no user movement, the proximity-sensing device 104 may continue with the default pulsing scheme at 806 (pulsing scheme described herein). However, at 808, the proximity-sensing device 104 may determine that there is user movement and may further determine a type of the user motion (e.g., major movement, minor movement, static user, etc.).

The proximity-sensing device 104 may emit the pulsed ultrasonic signals using motion-dependent parameters 242 that are used based on the type of motion being detected. For instance, the proximity-sensing device 104 may determine if there is major motion (e.g., the user walking towards or away from the device), minor motion (e.g., user washing dishes, cooking food, etc.), or the user is static (e.g., distance is almost constant, such as the user sitting down). The proximity-sensing device 104 may use the motion-dependent parameters 242 based on the different types of motion being detected. As an example, the proximity-sensing device 104 may emit ultrasonic signals with a higher pulse spacing when major motion has been detected as the user is relatively easy to sense during major motion and less pulses are needed. As another example, the proximity-sensing device 104 may use smaller pulse spacing (higher frame rate) with lower pulse width during minor motion as the movements are more difficult to detect are more frames are necessary. As an even further example, the proximity-sensing device 104 may use higher pulse spacing (low frame rate) when the user is static in order to detect any movements that might be made by the user.

At 810, the proximity-sensing device 104 may determine motion-dependent parameters 242 that are appropriate for the type of motion. At 812, the proximity-sensing device 104 may emit the pulsed ultrasonic signals 114 using the motion-dependent parameters 242. Generally, determine major motion, minor motion, or static may be performed based on the energy value differences across frames of received signals, and/or ToF data for the frames. If the distance between the user 106 and the proximity-sensing device 104 is changing greatly (e.g., over 6 inches per second, over 1 foot per second, etc.), that may be major movement, for example.

The determination of the type of user motion performed at 808 may be performed using energy values for frames emitted over relatively longer periods of time (e.g., over 10 seconds, over 20 seconds, etc.). The distance component 226 may be used to determine changes in distances over the window of time, classify the change in distances as being major, minor, or static, and determine whether the user 106 is primarily undergoing a particular type of movement during the period of time.

FIGS. 9A, 9B, 10, and 11 illustrate flow diagrams of example processes 900, 1000, and 1100 that illustrate aspects of the functions performed at least partly by the proximity-sensing device 104 as described in this disclosure. The logical operations described herein with respect to FIGS. 9A, 9B, 10, and 11 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 9A, 9B, 10, and 11 B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The steps of processes 900, 1000, and 1100 may be performed by a proximity-sensing device 104 including a microphone 112, a loudspeaker 110, one or more processors 202, and one or more computer-readable media 204 storing computer-executable instructions that, when executed by the one or more processors, cause the one or more processors to perform operations of processes 900, 1000, and 1100.

Figure 9A:
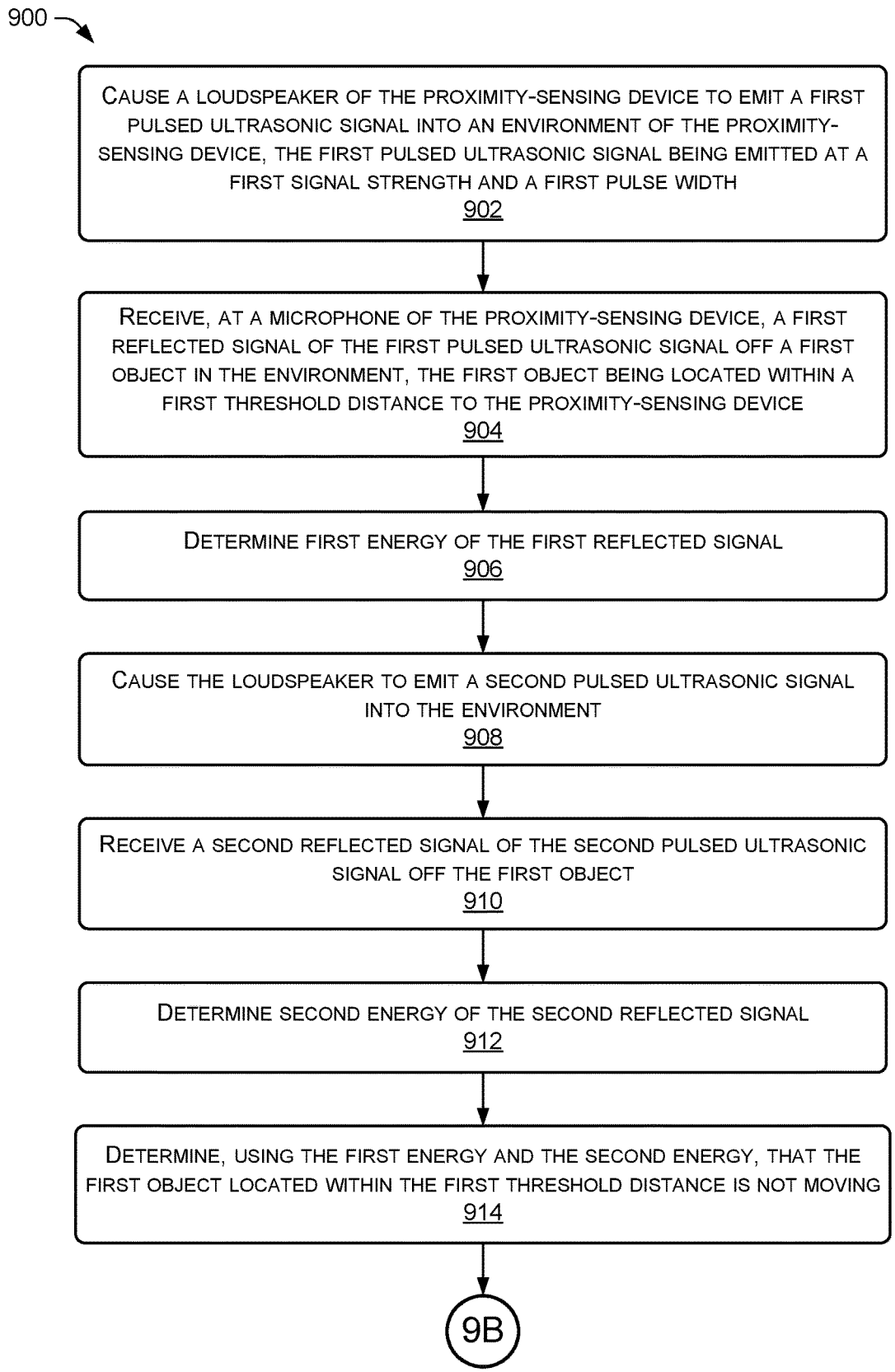
FIGS. 9A and 9B collectively illustrate a flow diagram of an example process for using ultrasonic signals to determine that there are no moving objects within a first distance, increasing the pulse width of the pulsed ultrasonic signals, and then detecting an object in motion using pulsed ultrasonic signals at the increased pulsed width.
Figure 9B:
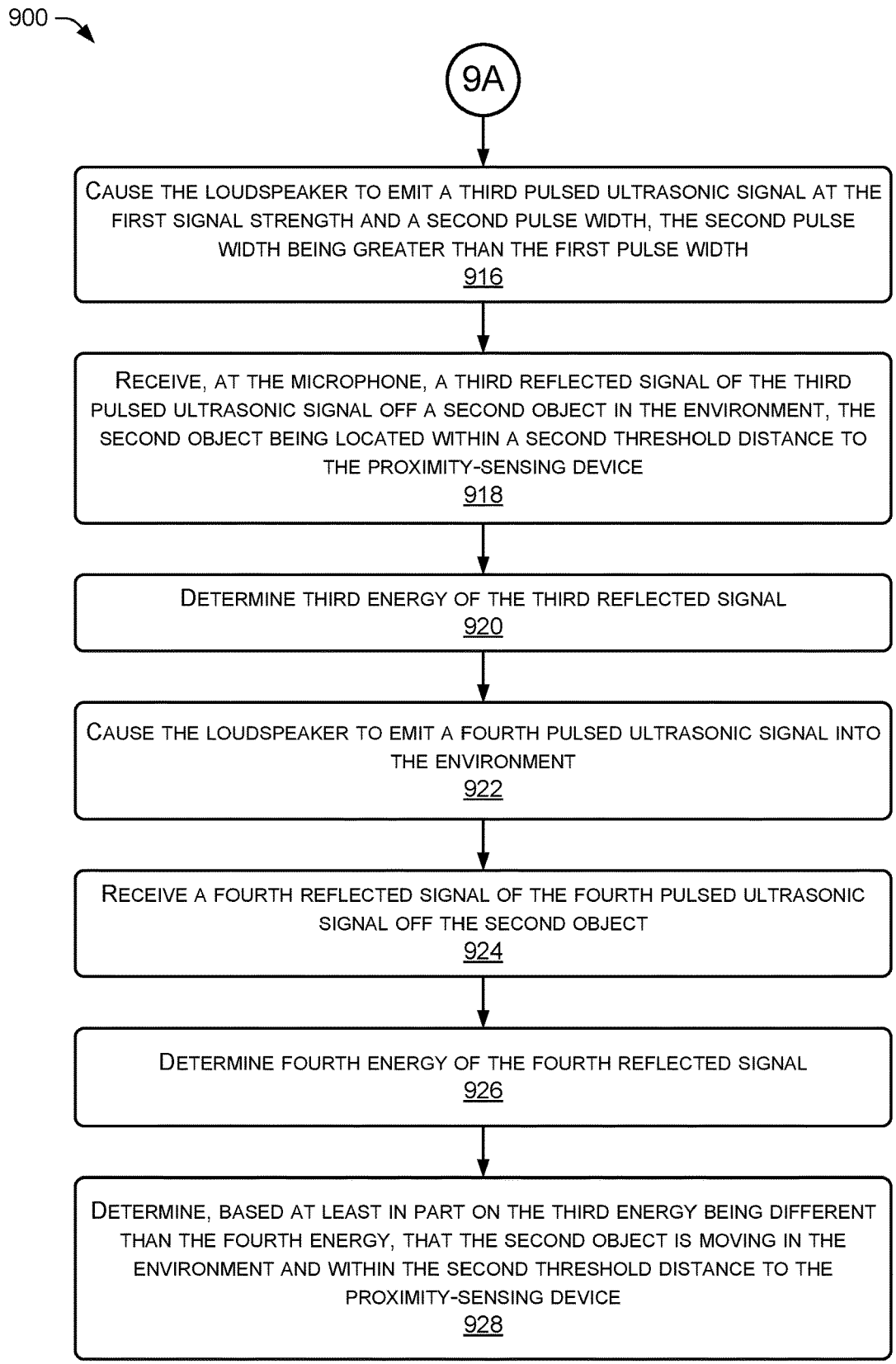

FIGS. 9A and 9B collectively illustrate a flow diagram of an example process for using ultrasonic signals to determine that there are no moving objects within a first distance, increasing the pulse width of the pulsed ultrasonic signals 114, and then detecting an object in motion using pulsed ultrasonic signals 114 at the increased pulsed width.

At 902, the proximity-sensing device 104 may cause a loudspeaker 110 to emit a first pulsed ultrasonic signal 114 into an environment of the proximity-sensing device 104 where the first pulsed ultrasonic signal 114 being emitted at a first pulse strength and a first pulse width. The pulse strengths, pulse widths, and pulse spacings may be determined through testing and may be device specific. For instance, the pulse strengths, pulse widths, and pulse spacings may be different for different devices based on different hardware differences, but may be selected to help optimize SNR values.

At 904, the proximity-sensing device 104 may receive, at a microphone 112 of the proximity-sensing device 104, a first reflected signal 122 based on the first pulsed ultrasonic signal 114 reflecting off a first object in the environment where the first object is located within a first threshold distance to the proximity-sensing device 104.

At 906, the proximity-sensing device 104 may determine first energy of the first reflected signal. The first energy may generally correspond to or be based on an amplitude of the first reflected signal 122 when received at the proximity-sensing device 104.

At 908, the proximity-sensing device 104 may cause the loudspeaker 110 to emit a second pulsed ultrasonic signal 114 into the environment. The second pulsed ultrasonic signal 114 may be emitted at the first pulse strength.

At 910, the proximity-sensing device 104 may receive a second reflected signal 122 based on the second pulsed ultrasonic signal 114 reflecting off the first object.

At 912, the proximity-sensing device 104 may determine second energy of the second reflected signal. The second energy may generally correspond to or be based on an amplitude of the second reflected signal 122 when received at the proximity-sensing device 104.

At 914, the proximity-sensing device 104 may determine, using the first energy and the second energy, that the first object located within the first threshold distance is not moving. Increases or decreases in the energy across different frames generally indicates that the object is moving towards or away from the proximity-sensing device 104, and lack of change in energy (or changes less than a threshold) may indicate that the first object is not moving (e.g., static object).

At 916, the proximity-sensing device 104 may, based at least in part on the first object not moving, cause the loudspeaker 110 to emit a third pulsed ultrasonic signal 114 at the first pulse strength and a second pulse width, the second pulse width being greater than the first pulse width. For instance, the proximity-sensing device 104 may transition from a short-range detection process 302 and into a mid-range detection process 310.

At 918, the proximity-sensing device 104 may receive, at the microphone 112, a third reflected signal 122 based on the third pulsed ultrasonic signal 114 reflecting off a second object in the environment where the second object is located within a second threshold distance to the proximity-sensing device 104 (e.g., within mid-range distance 132).

At 920, the proximity-sensing device 104 may determine third energy of the third reflected signal. The third energy may generally correspond to or be based on an amplitude of the third reflected signal 122 when received at the proximity-sensing device 104.

At 922, the proximity-sensing device 104 may cause the loudspeaker 110 to emit a fourth pulsed ultrasonic signal 114 into the environment. At 924, the proximity-sensing device 104 may receive a fourth reflected signal 122 based on the fourth pulsed ultrasonic signal 114 reflecting off the second object.

At 926, the proximity-sensing device 104 may determine fourth energy of the fourth reflected signal. The fourth energy may generally correspond to or be based on an amplitude of the fourth reflected signal 122 when received at the proximity-sensing device 104.

At 928, the proximity-sensing device 104 may determine, based at least in part on the third energy being different than the fourth energy, that the second object is moving in the environment and within the second threshold distance to the proximity-sensing device 104. Increases or decreases in the energy across different frames generally indicates that the object is moving towards or away from the proximity-sensing device 104.

In some instances, the process 900 may further include, based at least in part on the second object moving in the environment, increasing an amount of time between emissions of subsequent pulsed ultrasonic signals 114.

In some instances, the process 900 may further include determining that the loudspeaker 110 is emitting audible sound at a particular volume level, and identifying signal parameters 240 at which the loudspeaker 110 is to emit pulsed ultrasonic signals based at least in part on the particular volume level where the signal parameters 240 indicate the first pulse strength and the first pulse width.

Figure 10:
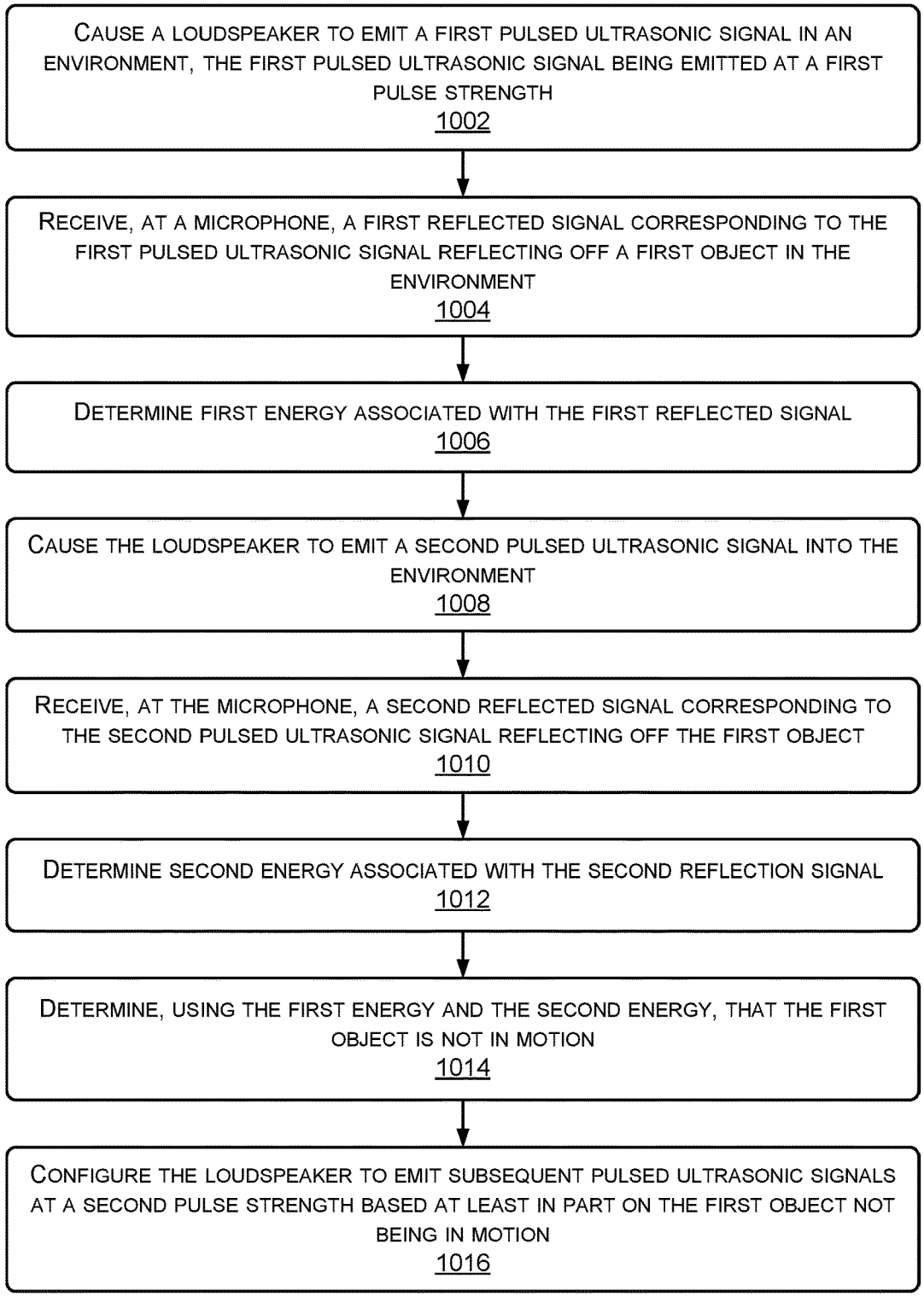
FIG. 10 illustrates a flow diagram of an example process for using ultrasonic signals to determine that there are no moving objects within a first distance, and increasing the pulse strength of subsequent pulsed ultrasonic signals to detect movement within a second distance.

FIG. 10 illustrates a flow diagram of an example process 900 for using ultrasonic signals to determine that there are no moving objects within a first distance, and increasing the pulse strength of subsequent pulsed ultrasonic signals to detect movement within a second distance.

At 1002, the computing device (e.g., proximity-sensing device 104) may cause a loudspeaker 110 to emit a first pulsed ultrasonic signal 114 into an environment of the proximity-sensing device 104 where the first pulsed ultrasonic signal 114 being emitted at a first pulse strength. The pulse strength may be determined through testing and may be device specific. For instance, the pulse strength may be different for different devices based on different hardware differences, but may be selected to help optimize SNR values.

At 1004, the computing device may receive, at a microphone 112 of the proximity-sensing device 104, a first reflected signal 122 based on the first pulsed ultrasonic signal 114 reflecting off a first object in the environment where the first object is located within a first threshold distance to the proximity-sensing device 104.

At 1006, the computing device may determine first energy of the first reflected signal. The first energy may generally correspond to or be based on an amplitude of the first reflected signal 122 when received at the proximity-sensing device 104.

At 1008, the computing device may cause the loudspeaker 110 to emit a second pulsed ultrasonic signal 114 into the environment. The second pulsed ultrasonic signal 114 may be emitted at the first pulse strength.

At 1010, the computing device may receive a second reflected signal 122 based on the second pulsed ultrasonic signal 114 reflecting off the first object.

At 1012, the computing device may determine second energy of the second reflected signal. The second energy may generally correspond to or be based on an amplitude of the second reflected signal 122 when received at the proximity-sensing device 104.

At 1014, the computing device may determine, using the first energy and the second energy, that the first object located within the first threshold distance is not moving. Increases or decreases in the energy across different frames generally indicates that the object is moving towards or away from the proximity-sensing device 104, and lack of change in energy (or changes less than a threshold) may indicate that the first object is not moving (e.g., static object).

At 1016, the computing device may configure the loudspeaker 110 to emit subsequent pulsed ultrasonic signals 114 at a second pulse strength based at least in part on the first object not being in motion. In some examples, the second pulse strength is greater than the first pulse strength and associated with detecting moving objects within a second distance from the computing device. For instance, the proximity-sensing device 104 may transition from a mid-range detection process 310 and into a long-range detection process 318.

Figure 11:
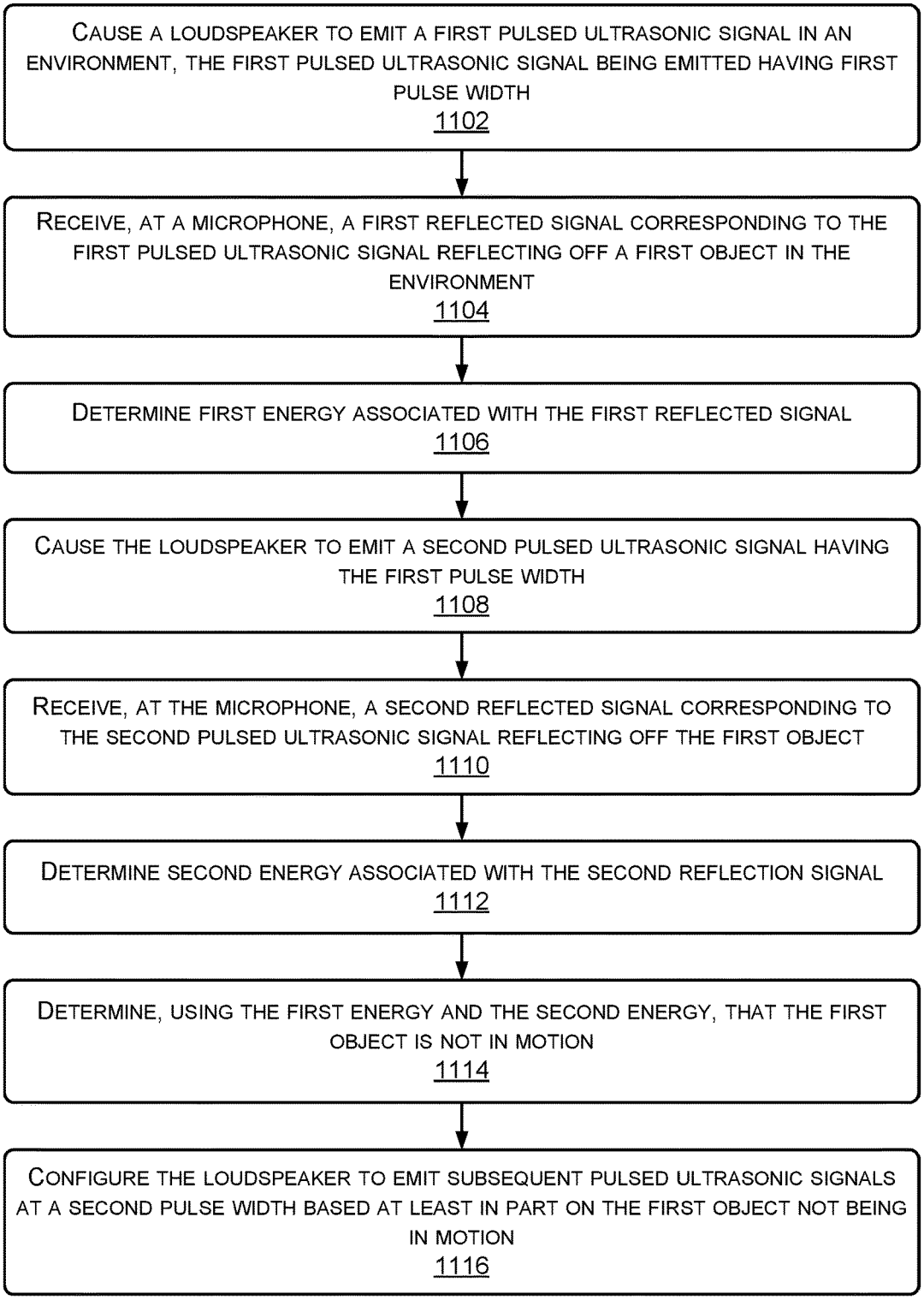
FIG. 11 illustrates a flow diagram of an example process for using ultrasonic signals to determine that there are no moving objects within a first distance, and increasing the pulse width of subsequent pulsed ultrasonic signals to detect movement within a second distance.

FIG. 11 illustrates a flow diagram of an example process 1100 for using ultrasonic signals to determine that there are no moving objects within a first distance, and increasing the pulse width of subsequent pulsed ultrasonic signals to detect movement within a second distance.

At 1102, the computing device (e.g., proximity-sensing device 104) may cause a loudspeaker 110 to emit a first pulsed ultrasonic signal 114 into an environment of the proximity-sensing device 104 where the first pulsed ultrasonic signal 114 being emitted at a first pulse width. The pulse width may be determined through testing and may be device specific. For instance, the pulse width may be different for different devices based on different hardware differences, but may be selected to help optimize SNR values.

At 1104, the computing device may receive, at a microphone 112 of the proximity-sensing device 104, a first reflected signal 122 based on the first pulsed ultrasonic signal 114 reflecting off a first object in the environment where the first object is located within a first threshold distance to the proximity-sensing device 104.

At 1106, the computing device may determine first energy of the first reflected signal. The first energy may generally correspond to or be based on an amplitude of the first reflected signal 122 when received at the proximity-sensing device 104.

At 1108, the computing device may cause the loudspeaker 110 to emit a second pulsed ultrasonic signal 114 into the environment. The second pulsed ultrasonic signal 114 may be emitted at the first pulse width.

At 1110, the computing device may receive a second reflected signal 122 based on the second pulsed ultrasonic signal 114 reflecting off the first object.

At 1112, the computing device may determine second energy of the second reflected signal. The second energy may generally correspond to or be based on an amplitude of the second reflected signal 122 when received at the proximity-sensing device 104.

At 1114, the computing device may determine, using the first energy and the second energy, that the first object located within the first threshold distance is not moving. Increases or decreases in the energy across different frames generally indicates that the object is moving towards or away from the proximity-sensing device 104, and lack of change in energy (or changes less than a threshold) may indicate that the first object is not moving (e.g., static object).

At 1116, the computing device may cause the loudspeaker 110 to emit subsequent pulsed ultrasonic signals 114 at a second pulse width based at least in part on the first object not being in motion. In some examples, the second pulse width is greater than the first pulse width and associated with detecting moving objects within a second distance from the computing device. For instance, the proximity-sensing device 104 may transition from a short-range detection process 302 and into a mid-range detection process 310.

As used herein, a processor, such as processor(s) 202 may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 202 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 202 may possess its own local memory, which also may store program components, program data, and/or one or more operating systems.

As described herein, computer-readable media and/or memory 204 may include volatile and nonvolatile memory, removable and non-removable media implemented in any method or technology for storage of information, such as computer-readable instructions, data structures, program component, or other data. Such computer-readable media and/or memory 204 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 202 to execute instructions stored on the computer-readable media and/or memory 204. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information, and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media and/or memory 204, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 238 may enable communications between the proximity-sensing device 104 and other networked devices. Such network interface(s) 238 can include one or more network interface controllers (NICs) or other types of transceiver devices to send and receive communications over a network. For instance, the network interface(s) 238 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, the network interface(s) 238 may include a wide area network (WAN) component to enable communication over a wide area network. The networks that the proximity-sensing device 104 may communicate over may represent an array of wired networks, wireless networks, such as WiFi, or combinations thereof.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed by a proximity-sensing device comprising:
    causing a loudspeaker of the proximity-sensing device to emit a first pulsed ultrasonic signal into an environment of the proximity-sensing device, the first pulsed ultrasonic signal being emitted at a first pulse strength and a first pulse width;
    receiving, at a microphone of the proximity-sensing device, a first reflected signal based on the first pulsed ultrasonic signal reflecting off a first object in the environment, the first object being located within a first threshold distance to the proximity-sensing device;
    determining first energy of the first reflected signal;
    causing the loudspeaker to emit a second pulsed ultrasonic signal into the environment;
    receiving a second reflected signal based on the second pulsed ultrasonic signal reflecting off the first object;
    determining second energy of the second reflected signal;
    determining, using the first energy and the second energy, that the first object located within the first threshold distance is not moving;
    based at least in part on the first object not moving, causing the loudspeaker to emit a third pulsed ultrasonic signal at the first pulse strength and a second pulse width, the second pulse width being greater than the first pulse width;
    receiving, at the microphone, a third reflected signal based on the third pulsed ultrasonic signal reflecting off a second object in the environment, the second object being located within a second threshold distance to the proximity-sensing device;
    determining third energy of the third reflected signal;
    causing the loudspeaker to emit a fourth pulsed ultrasonic signal into the environment;
    receiving a fourth reflected signal based on the fourth pulsed ultrasonic signal reflecting off the second object;
    determining fourth energy of the fourth reflected signal; and
    determining, based at least in part on the third energy being different than the fourth energy, that the second object is moving in the environment and within the second threshold distance to the proximity-sensing device.

2. The method of claim 1, further comprising, based at least in part on the second object moving in the environment, increasing an amount of time between emissions of subsequent pulsed ultrasonic signals.

3. The method of claim 1, further comprising, prior to emitting the first pulsed ultrasonic signal:
    determining that the loudspeaker is emitting audible sound at a particular volume level; and
    identifying signal parameters at which the loudspeaker is to emit pulsed ultrasonic signals based at least in part on the particular volume level, the signal parameters indicating the first pulse strength and the first pulse width, wherein the first pulsed ultrasonic signal is emitted by the loudspeaker concurrently with the audible sound.

4. The method of claim 1, wherein:
the third pulsed ultrasonic signal was emitted at a first time, the third reflected signal was received at a second time, the fourth pulsed ultrasonic signal was emitted at a third time and the fourth reflected signal was received at a fourth time; and
the third pulsed ultrasonic signal and the fourth pulsed ultrasonic signal had a first pulse spacing between emissions,
further comprising:
determining, based at least in part on a first difference between the first time and the second time, a first distance between the second object and the proximity-sensing device;
determining, based at least in part on a second difference between the third time and the fourth time, a second distance between the second object and the proximity-sensing device;
determining a third difference between the first distance and the second distance; and
emitting, based on the third difference, subsequent pulsed ultrasonic signals having a second pulse spacing different from the first pulse spacing.

5. A computing device comprising:
a loudspeaker;
a microphone;
one or more processors; and
one or more computer-readable media storing computer-executable instructions that, when executed by the one or more processors, cause the one or more processors to perform operations comprising:
causing the loudspeaker to emit a first pulsed ultrasonic signal in an environment, the first pulsed ultrasonic signal being emitted at a first pulse strength associated with detecting moving objects within a first distance from the computing device;
receiving, at the microphone, a first reflected signal corresponding to the first pulsed ultrasonic signal reflecting off a first object in the environment;
determining first energy associated with the first reflected signal;
causing the loudspeaker to emit a second pulsed ultrasonic signal at the first pulse strength;
receiving, at the microphone, a second reflected signal corresponding to the second pulsed ultrasonic signal reflecting off the first object;
determining second energy associated with the second reflection signal;
determining, using the first energy and the second energy, that the first object is not in motion; and
configuring the loudspeaker to emit subsequent pulsed ultrasonic signals at a second pulse strength based at least in part on the first object not being in motion, the second pulse strength being greater than the first pulse strength and associated with detecting moving objects within a second distance from the computing device.

6. The computing device of claim 5, wherein the first and second pulsed ultrasonic signals each have a first pulse width, the operations further comprising:
based at least in part on the first object not moving, configuring the loudspeaker to emit the subsequent pulsed ultrasonic signals at a second pulse strength, wherein the second pulse strength is lower than the first pulse strength and the subsequent pulsed ultrasonic signals have a second pulse width that is lower than the first pulse width.

7. The computing device of claim 5, wherein the first and second pulsed ultrasonic signals each have a first pulse spacing, the operations further comprising:
causing the loudspeaker to emit a third pulsed ultrasonic signal at the second pulse strength;
receiving a third reflected signal based on the third pulsed ultrasonic signal reflecting off a second object;
determining third energy of the third reflected signal;
causing the loudspeaker to emit a fourth pulsed ultrasonic signal at the second pulse strength;
receiving a fourth reflected signal based on the fourth pulsed ultrasonic signal reflecting off the second object;
determining fourth energy of the fourth reflected signal;
determining, based at least in part on the third energy being different than the fourth energy, that the second object is moving in the environment and is within the second distance of the computing device; and
increasing the first pulse spacing to a second pulse spacing between emissions of subsequent pulsed ultrasonic signals.

8. The computing device of claim 5, the operations further comprising:
causing the loudspeaker to emit a third pulsed ultrasonic signal at the second pulse strength;
receiving a third reflected signal based on the third pulsed ultrasonic signal reflecting off a second object;
determining third energy of the third reflected signal;
causing the loudspeaker to emit a fourth pulsed ultrasonic signal at the second pulse strength and at a first time;
receiving, at a second time, a fourth reflected signal based on the fourth pulsed ultrasonic signal reflecting off the second object;
determining fourth energy of the fourth reflected signal;
determining, based at least in part on the third energy being different than the fourth energy, that the second object is moving in the environment;
determining, based at least in part on a difference between the first time and the second time, a distance between the computing device and the second object;
determining that the distance is less than or equal to the first distance; and
configuring the loudspeaker to emit additional pulsed ultrasonic signals at the first pulse strength.

9. The computing device of claim 5, wherein the first and second pulsed ultrasonic signals each have a first pulse width, the operations further comprising:
receiving, at the microphone, a third reflected signal based on the third pulsed ultrasonic signal reflecting off a second object;
determining third energy of the third reflected signal;
causing the loudspeaker to emit a fourth pulsed ultrasonic signal into the environment, the fourth pulsed ultrasonic signal being emitted at the second pulse strength;
receiving, at the microphone, a fourth reflected signal based on the fourth pulsed ultrasonic signal reflecting off the second object;
determining fourth energy of the fourth reflected signal;
determining, based at least in part on the third energy being different than the fourth energy, that the second object is not moving in the environment; and
increasing the first pulse width to a second pulse width for emissions of subsequent pulsed ultrasonic signals.

10. The computing device of claim 5, the operations further comprising, prior to emitting the first pulsed ultrasonic signal:
- determining that the loudspeaker is emitting audible sound at a particular volume level; and
- identifying signal parameters associated with the first pulsed ultrasonic signal based at least in part on the particular volume level, the signal parameters indicating the first pulse strength.

11. The computing device of claim 5, the operations further comprising:
- causing the loudspeaker to emit a third pulsed ultrasonic signal at the second pulse strength;
- receiving a third reflected signal based on the third pulsed ultrasonic signal reflecting off a second object;
- determining third energy of the third reflected signal;
- causing the loudspeaker to emit a fourth pulsed ultrasonic signal at the second pulse strength, the third pulsed ultrasonic signal and the fourth pulsed ultrasonic signal having a first pulse spacing;
- receiving a fourth reflected signal based on the fourth pulsed ultrasonic signal reflecting off the second object;
- determining fourth energy of the fourth reflected signal; and
- determining, based at least in part on the third energy being different than the fourth energy, that the second object is moving in the environment and within the second distance to the computing device.

12. The computing device of claim 11, wherein:
- the third pulsed ultrasonic signal was emitted at a first time, the third reflected signal was received at a second time, the fourth pulsed ultrasonic signal was emitted at a third time and the fourth reflected signal was received at a fourth time; and
- the third pulsed ultrasonic signal and the fourth pulsed ultrasonic signal have a first pulse spacing, the operations further comprising:
- determining, based at least in part on a first difference between the first time and the second time, a first distance between the second object and the computing device;
- determining, based at least in part on a second difference between the third time and the fourth time, a second distance between the second object and the computing device;
- determining a third difference between the first distance and the second distance; and
- emitting, based on the third difference, subsequent pulsed ultrasonic signals having a second pulse spacing different from the first pulse spacing.

13. The computing device of claim 5, wherein the first and second pulsed ultrasonic signals each have a first pulse width and a first transmission power, the operations further comprising:
- determining a second pulse width based at least in part on a difference between the first pulse strength and the second pulse strength;
- determining that subsequent pulsed ultrasonic signals emitted at the second pulse strength have a second transmission power that is substantially equivalent to the first transmission power; and
- emitting, using the loudspeaker, the subsequent pulsed ultrasonic signals with the second pulse strength, the second pulse width, and the second transmission power that is substantially equivalent to the first transmission power.

14. A method comprising:
- causing a loudspeaker of a computing device to emit a first pulsed ultrasonic signal in an environment, the first pulsed ultrasonic signal being emitted at a first pulse width associated with detecting moving objects within a first distance from the computing device;
- receiving, at a microphone of the computing device, a first reflected signal based on the first pulsed ultrasonic signal reflecting off a first object in the environment;
- determining first energy associated with the first reflected signal;
- causing the loudspeaker to emit a second pulsed ultrasonic signal having the first pulse width;
- receiving, at the microphone, a second reflected signal based on the second pulsed ultrasonic signal reflecting off the first object;
- determining second energy associated with the second reflection signal;
- determining, using the first energy and the second energy, that the first object is not in motion; and
- causing the loudspeaker to emit subsequent pulsed ultrasonic signals at a second pulse width based at least in part on the first object not being in motion, the second pulse width being greater than the first pulse width and associated with detecting moving objects within a second distance from the computing device.

15. The method of claim 14, wherein the first and second pulsed ultrasonic signals were emitted with a first pulse spacing, further comprising:
- causing the loudspeaker to emit a third pulsed ultrasonic signal at the second pulse width;
- receiving a third reflected signal based on the third pulsed ultrasonic signal reflecting off a second object;
- determining third energy of the third reflected signal;
- causing the loudspeaker to emit a fourth pulsed ultrasonic signal at the second pulse width;
- receiving a fourth reflected signal of the fourth pulsed ultrasonic signal off the second object;
- determining fourth energy of the fourth reflected signal;
- determining, based at least in part on the third energy being different than the fourth energy, that the second object is moving in the environment and within the second distance to the computing device; and
- increasing the first pulse spacing to a second pulse spacing between emissions of subsequent pulsed ultrasonic signals.

16. The method of claim 14, wherein the first and second pulsed ultrasonic signals each have a first pulse strength, further comprising:
- causing the loudspeaker to emit a third pulsed ultrasonic signal at the second pulse width;
- receiving a third reflected signal based on the third pulsed ultrasonic signal reflecting off a second object;
- determining third energy of the third reflected signal;
- causing the loudspeaker to emit a fourth pulsed ultrasonic signal at the second pulse width;
- receiving a fourth reflected signal based on the fourth pulsed ultrasonic signal reflecting off the second object;
- determining fourth energy of the fourth reflected signal;
- determining, using the third energy and the fourth energy, that the second object is not in motion in the environment; and
- causing the loudspeaker to emit a fifth pulsed ultrasonic signal at a second pulse strength that is greater than the first pulse strength.

17. The method of claim 14, further comprising, prior to emitting the first pulsed ultrasonic signal:
- determining that the loudspeaker is emitting audible sound at a particular volume level; and
- identifying signal parameters associated with the first pulsed ultrasonic signal based at least in part on the particular volume level, the pulsed signal parameters indicating the first pulse width.

18. The method of claim 14, further comprising:
- causing the loudspeaker to emit a third pulsed ultrasonic signal at the second pulse width;
- receiving a third reflected signal based on the third pulsed ultrasonic signal reflecting off a second object;
- determining third energy of the third reflected signal;
- causing the loudspeaker to emit a fourth pulsed ultrasonic signal at the second pulse width, the third pulsed ultrasonic signal and the fourth pulsed ultrasonic signal having a first pulse spacing;
- receiving a fourth reflected signal based on the fourth pulsed ultrasonic signal reflecting off the second object;
- determining fourth energy of the fourth reflected signal; and
- determining, based at least in part on the third energy being different than the fourth energy, that the second object is moving in the environment and within the second distance to the computing device.

19. The method of claim 18, wherein:
- the third pulsed ultrasonic signal was emitted at a first time, the third reflected signal was received at a second time, the fourth pulsed ultrasonic signal was emitted at a third time and the fourth reflected signal was received at a fourth time; and
- the third pulsed ultrasonic signal and the fourth pulsed ultrasonic signal had a first pulse spacing between emissions, further comprising:
- determining, based at least in part on a first difference between the first time and the second time, a first distance between the second object and the computing device;
- determining, based at least in part on a second difference between the third time and the fourth time, a second distance between the second object and the computing device;
- determining a third difference between the first distance and the second distance; and
- emitting, based on the third difference, subsequent pulsed ultrasonic signals having a second pulse spacing different from the first pulse spacing.

20. The method of claim 14, further comprising, prior to emitting the first pulsed ultrasonic signal:
- determining that the loudspeaker is emitting audible sound at a particular frequency; and
- identifying signal parameters at which the loudspeaker is to emit pulsed ultrasonic signals based at least in part on the particular frequency, the signal parameters indicating the first pulse width,
- wherein the first pulsed ultrasonic signal is emitted by the loudspeaker concurrently with the audible sound.

* * * * *